(12) United States Patent
Ezawa et al.

(10) Patent No.: US 8,405,737 B2
(45) Date of Patent: Mar. 26, 2013

(54) LENS UNIT

(75) Inventors: Kozo Ezawa, Osaka (JP); Teruyuki Takizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 122 days.

(21) Appl. No.: 12/994,341

(22) PCT Filed: Mar. 30, 2010

(86) PCT No.: PCT/JP2010/002329
§ 371 (c)(1),
(2), (4) Date: Nov. 23, 2010

(87) PCT Pub. No.: WO2010/116687
PCT Pub. Date: Oct. 14, 2010

(65) Prior Publication Data
US 2011/0069198 A1    Mar. 24, 2011

(30) Foreign Application Priority Data

Apr. 6, 2009  (JP) ................................. 2009-091744

(51) Int. Cl.
*H04N 5/228* (2006.01)
(52) U.S. Cl. .................. 348/222.1; 396/349; 348/340
(58) Field of Classification Search ............... 348/222.1; 359/819
See application file for complete search history.

(56) References Cited

U.S. PATENT DOCUMENTS

| | | | |
|---|---|---|---|
| 7,095,572 B2 * | 8/2006 | Lee et al. ...................... 359/808 |
| 7,419,315 B2 * | 9/2008 | Hirata et al. .................. 396/529 |
| 7,787,199 B2 * | 8/2010 | Tsai et al. ..................... 359/819 |
| 7,808,730 B2 * | 10/2010 | Yoon ............................. 359/826 |

(Continued)

FOREIGN PATENT DOCUMENTS

| | | |
|---|---|---|
| JP | 07-005352 | 1/1995 |
| JP | 2002-286987 | 10/2002 |

(Continued)

OTHER PUBLICATIONS

International Search Report for corresponding International Application No. PCT/JP2010/002329 mailed May 11, 2010.

(Continued)

*Primary Examiner* — Chieh M Fan
*Assistant Examiner* — Fayez Bhuiyan
(74) *Attorney, Agent, or Firm* — Renner, Otto, Boisselle & Sklar, LLP

(57) ABSTRACT

A lens unit according to the present invention includes: a barrel, which has first and second openings and an inner space defined along a center axis between the first and second openings; and lenses held in the inner space. In each pair of adjacent lenses, when projected parallel to their optical axis, one lens located closer to the second opening has a greater projection than the other lens located closer to the first opening. The barrel has inner side surface portions, which are arranged parallel to the center axis to define cross sections corresponding to the respective projections of the lenses. In each pair of adjacent inner side surface portions, one portion located closer to the second opening has a greater cross section than the other portion located closer to the first opening. The barrel has main grooves cut on the inner side surface portions to run from the first opening toward the second opening. Each of the lens units is bonded to an associated inner side surface portion with an adhesive that fills at least partially the main grooves on the inner side surface portion.

13 Claims, 22 Drawing Sheets

U.S. PATENT DOCUMENTS

| | | | |
|---|---|---|---|
| 7,839,586 B2 * | 11/2010 | Woo et al. ............... | 359/824 |
| 8,144,408 B2 * | 3/2012 | Lin et al. ................. | 359/823 |
| 2004/0076420 A1 * | 4/2004 | Orimoto .................. | 396/349 |
| 2007/0076309 A1 * | 4/2007 | Shimizu et al. .......... | 359/811 |
| 2009/0195897 A1 * | 8/2009 | Tsai et al. ................ | 359/819 |

FOREIGN PATENT DOCUMENTS

| | | |
|---|---|---|
| JP | 2003-029113 | 1/2003 |
| JP | 2003-307660 | 10/2003 |
| JP | 2004-085706 | 3/2004 |
| JP | 2005-164811 | 6/2005 |
| JP | 2007-094241 | 4/2007 |
| JP | 2007-108485 | 4/2007 |
| JP | 2007-187776 | 7/2007 |
| JP | 2007-310276 | 11/2007 |

OTHER PUBLICATIONS

Form PCT-ISA-237 for corresponding International Application No. PCT/JP2010/002329 mailed May 11, 2010 and partial English translation.

* cited by examiner

12A(12B、12C)

12A(12B、12C)

LENS UNIT

TECHNICAL FIELD

The present invention relates to a lens unit with multiple optical lenses, and more particularly relates to a lens unit that can be assembled easily to make a camera device, for example.

BACKGROUND ART

Thanks to recent advancement of technologies, digital still cameras (which are often called simply "digital cameras") have become rapidly popular nowadays and more and more people now use a cellphone with camera commonly. Under circumstances such as these, there is an increasing demand for techniques for further reducing the size of a camera device in one way or another. And the camera devices are also required to capture an image of even higher quality.

Generally speaking, a camera device has a lens unit consisting of multiple lenses for use to produce an image on the image capturing plane of an image sensor. The performance of a camera device (such as its resolution) depends heavily on how precisely the barrel and other parts of the lens unit can be designed and how accurately the lenses can be assembled together into the lens unit. That is why when the lens unit is made, a good care should be taken of how to bond those lenses and how to make adjustments on the lenses being assembled together.

Patent Document No. 1 discloses how to make an integral lens block by combining a number of lenses together with their optical axes aligned with each other. Hereinafter, such a conventional lens block making method as disclosed in Patent Document No. 1 will be described with reference to FIGS. 23 and 24.

FIG. 23 is a perspective view showing the procedure of inserting lenses into a fixing jig one after another. FIG. 24 is a cross-sectional view of the lenses that have been inserted into the fixing jig as viewed on a plane on which the optical axis of the lenses is defined. As shown in FIG. 23, first, second, third and fourth lenses 810, 820, 830 and 840 are inserted in this order into a fixing jig 710. As a result, the respective lenses are supported by the fixing jig 710 so as to be stacked one upon the other as shown in FIG. 24.

In such a state, an adhesive is injected through first, second, third and fourth sets of through holes 711A, 711B, and 711C, 712A, 712B and 712C, 713A, 713B and 713C, and 714A, 714B and 714C, all of which run from the outer side surface through the inner side surface of the fixing jig 710, thereby bonding the first, second, third and fourth lenses 810, 820, 830 and 840 together. In this manner, a lens block in which those four lenses are combined together is obtained. According to Patent Document No. 1, by moving the lenses with jig bars inserted into the respective through holes before these lenses are bonded together with the adhesive, the degrees of eccentricity of the lenses can be adjusted. The lens block that has been assembled in this manner will be secured to the barrel of a camera device.

Patent Document No. 2 discloses a lens unit in which when lenses are inserted into a barrel, jig bars are also inserted into multiple through holes that run through the side surface of the barrel to move the lenses, thereby adjusting the degrees of eccentricity of the lenses.

On the other hand, Patent Document No. 3 discloses a lens unit that can easily adjust the degrees of eccentricity by using lenses with a projection on their side surface. According to Patent Document No. 3, the barrel has notches and the lenses are arranged so that their projections are inserted into the notches. The positions of the lenses are adjusted with those projections, the lenses are fixed onto the barrel, and then unnecessary projections are cut off.

CITATION LIST

Patent Literature

Patent Document No. 1: Japanese Patent Application Laid-Open Publication No. 2007-94241
Patent Document No. 2: Japanese Patent Application Laid-Open Publication No. 2007-187776
Patent Document No. 3: Japanese Patent Application Laid-Open Publication No. 2004-85706

SUMMARY OF INVENTION

Technical Problem

According to the method of Patent Document No. 1, however, the lens block that has been assembled with the fixing jig needs to be transferred to a barrel, which is located elsewhere. That is why when the lens block is fixed into the barrel, the degrees of eccentricity need to be adjusted again between the lens block and the barrel.

Also, in the lens unit of Patent Document No. 2, external light will enter the barrel through the through holes, which are cut to adjust the degrees of eccentricity. Consequently, the optical property of the lens unit would be affected adversely.

Furthermore, in the lens unit of Patent Document No. 3, each lens has only one projection, and therefore, it is difficult to adjust the position of the lens precisely enough. On top of that, when the projection is cut off, unnecessary force might be applied to the lens, which could shift from its intended position as a result. What is worse, light could also enter the barrel from the region where the projection has been cut off, thus possibly producing a harmful effect in the optical property of the lens unit as in Patent Document No. 2.

What is more, if multiple lenses are bonded using the fixing jig disclosed in Patent Document No. 1, the adhesive should be injected through each set of through holes from three different directions. This is because each set of through holes 711A, 711B and 711C, etc., which are cut through the fixing jig, run radially from the outer periphery of the fixing jig toward its center. In that case, the adhesive should be dripped in three different directions, and therefore, could be injected too unevenly to combine the lenses firmly and uniformly. On top of that, syringes for injecting the adhesive should be arranged in three different directions to face the respective centers of the lenses, and therefore, a broad space should be left to put those syringes, thus preventing the workers from using the assembling work space efficiently.

It is therefore an object of the present invention to provide a lens unit in which multiple lenses can be aligned with each other highly precisely and which would achieve excellent optical properties.

Solution to Problem

A lens unit according to the present invention includes: a barrel, which has first and second openings and an inner space that is defined along a center axis between the first and second openings; and a number of lenses held in the inner space. In each pair of adjacent ones of the lenses, one of the two lenses located closer to the second opening has a greater projection shape which is projected in an optical axis thereof than the other lens located closer to the first opening. The barrel has a number of inner side surface portions, which are arranged parallel to the center axis to define cross sections corresponding to the respective projections of the lenses. In each pair of adjacent ones of the inner side surface portions, one of the two portions located closer to the second opening has a greater cross section than the other portion located closer to the first opening. The barrel has a number of main grooves that have been cut on the inner side surface portions to run from the first opening toward the second opening. Each of the lens units is bonded to an associated one of the inner side surface portions with an adhesive that fills at least partially the main grooves on the inner side surface portion.

In one preferred embodiment, the barrel has a positioning plane, which contacts with one of the lenses that is arranged closest to the first opening and which positions the lens in an optical axis direction. Each of the lenses contacts with its adjacent lens(es) in the optical axis direction, thereby positioning the lenses parallel to the center axis.

In another preferred embodiment, the barrel has a number of contacting portions, each of which contacts with an associated one of the lenses, thereby positioning the lens parallel to the center axis of that lens.

In this particular preferred embodiment, the barrel has an outer side surface, and none of the main grooves that have been cut on each said inner side surface portion reach the outer side surface.

In still another preferred embodiment, azimuths of the main grooves of each said inner side surface portion with respect to the center axis are different from those of the main grooves of any other one of the inner side surface portions.

In yet another preferred embodiment, in each said inner side surface portion, the main grooves are arranged at regular angular intervals around the center axis.

In a specific preferred embodiment, each and every one of the inner side surface portions has the same number of main grooves. And azimuths of the main grooves of each said inner side surface portion with respect to the center axis shift sequentially in one direction from the first opening toward the second opening.

In yet another preferred embodiment, in each said inner side surface portion, one end of each said main groove, which is closer to the first opening, is located between the two contacting surfaces of its associated lens along the center axis of the barrel.

In yet another preferred embodiment, the spaces to be produced adjacent to the side surface of each said lens by the main grooves of its associated inner side surface portion have substantially the same volumes everywhere.

In yet another preferred embodiment, in each said inner side surface portion, the respective bottoms of the main grooves are located at the same distance from the center axis of the barrel.

In yet another preferred embodiment, the inner side surface portions have at least one communicating groove that makes two adjacent ones of the main grooves continuous with each other.

In this particular preferred embodiment, each said communicating groove, which connects two main grooves together, is arranged closer to the second opening than one end of the two main grooves that is located closer to the first opening.

In yet another preferred embodiment, the space to be produced adjacent to the side surface of each said lens by at least one main groove on each said inner side surface portion and located closer to the first opening than the communicating groove is has substantially the same volume from one inner side surface portion to another.

A camera device according to the present invention includes: a lens unit according to any of the preferred embodiments of the present invention described above; an image capturing section, which has an image capturing area and which converts an image that has been captured by the lens unit into an electrical signal; and an image processing section, which receives the electrical signal from the image capturing section to generate image data representing the image.

Advantageous Effects of Invention

The lens unit of the present invention can align highly precisely the lenses to be inserted into the barrel and can also bond the lenses to the barrel with the bonding conditions equalized between the respective bonding portions. Consequently, the respective lenses can be bonded to the barrel uniformly. In addition, since the lenses can be aligned with each other with high precision, a lens unit with excellent optical properties is realized. On top of that, it is also possible to prevent unnecessary light from entering the barrel from outside of the barrel.

DESCRIPTION OF EMBODIMENTS

Embodiment 1

Hereinafter, a First Specific Preferred Embodiment of a lens unit according to the present invention will be described with reference to the accompanying drawings. In the preferred embodiment to be described below, the lens unit has four lenses. However, the lens unit just needs to have multiple lenses, and the number of lenses included in the lens unit may also be two, three, or even five or more. Also, the lens unit of the present invention can also be implemented in any of various sizes. For example, if the lenses to use are circular, the lens unit may be realized to include a number of lenses with a diameter of several millimeters to several centimeters.

Figure 1:
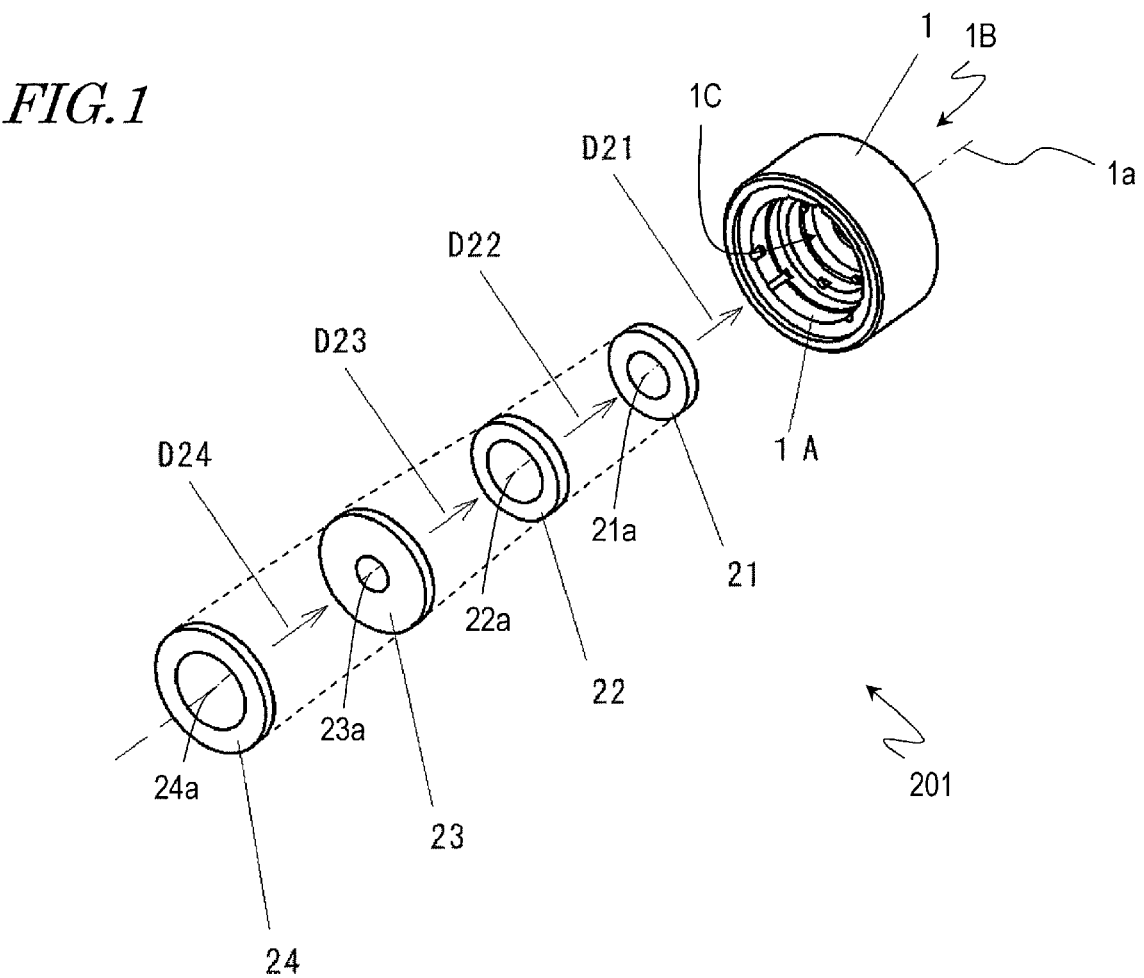
FIG. 1 is an exploded perspective view illustrating a first preferred embodiment of a lens unit according to the present invention.
Figure 2A:
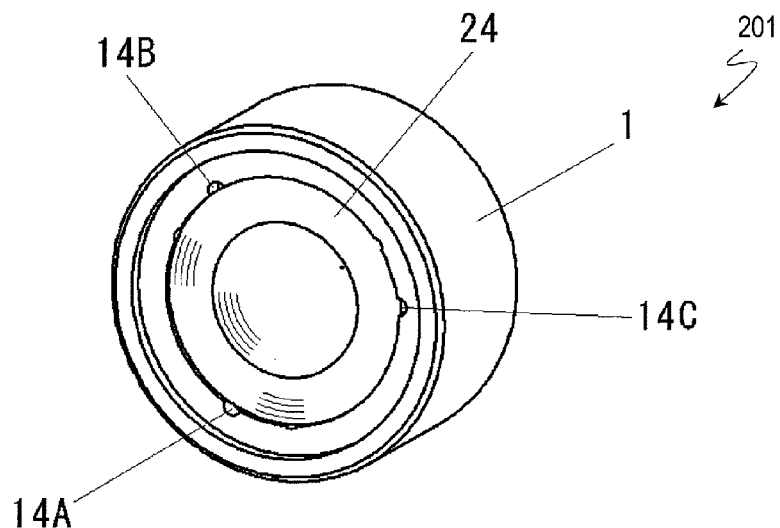
FIG. 2A is a perspective view illustrating the lens unit as the first preferred embodiment of the present invention.
Figure 2B:
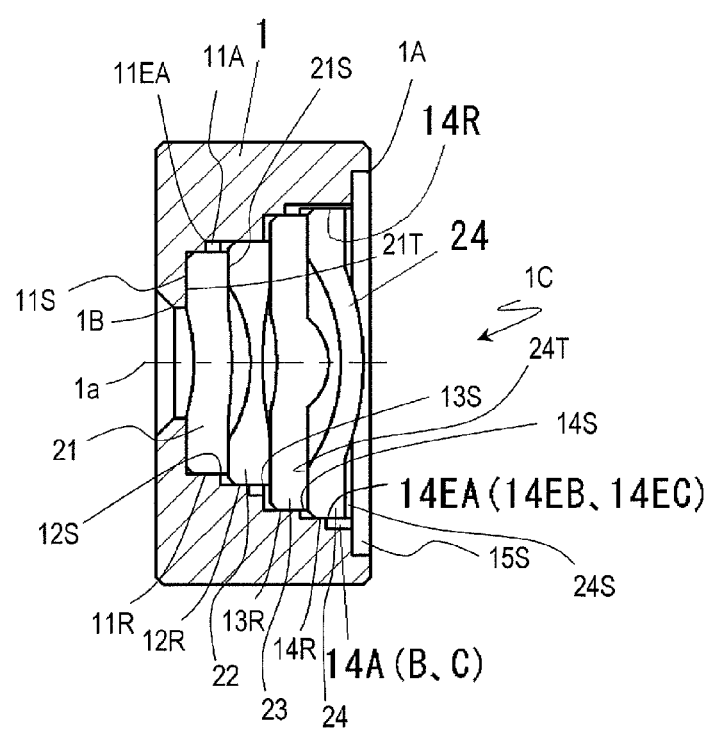
FIG. 2B is a cross-sectional view illustrating the lens unit as the first preferred embodiment of the present invention.

FIGS. 1, 2A and 2B are respectively an exploded perspective view, a perspective view, and a cross-sectional view illustrating a lens unit 201 as a first preferred embodiment of the present invention. The lens unit 201 includes a barrel 1 and first, second, third and fourth lenses 21, 22, 23 and 24. As shown in FIGS. 1 and 2B, the barrel 1 has first and second openings 1B and 1A and an inner space 1C that is defined along the center axis 1a of the barrel 1 between the first and second openings 1B and 1A. In the inner space 1C, held are the first, second, third and fourth lenses 21, 22, 23 and 24, which are arranged in this order from the first opening 1B toward the second opening 1A.

In each pair of adjacent ones of these lenses, when projected parallel to their optical axis, one of the two lenses located closer to the second opening 1A has a greater projection than the other lens located closer to the first opening 1B. As used herein, if one lens "has a greater projection than" the other, the former lens naturally has a larger projection area than the latter one. But not just that, it also means that when these two lenses are stacked one upon the other so that their optical axes are perfectly aligned with each other, the projection of the smaller lens is totally included within that of the larger one. Specifically, the projection of the fourth lens 24 is greater than that of the third one. The projection of the third lens 23 is greater than that of the second one. And the projection of the second lens 22 is greater than that of the first one. The projections of these lenses are normally circular, but may also be elliptical or rectangular as well. Furthermore, as long as the projections of each pair of adjacent lenses satisfy the relation described above, not all of these lenses have to have the same planar shape but some of them may be circular and the others may be rectangular, too.

Figure 3A:
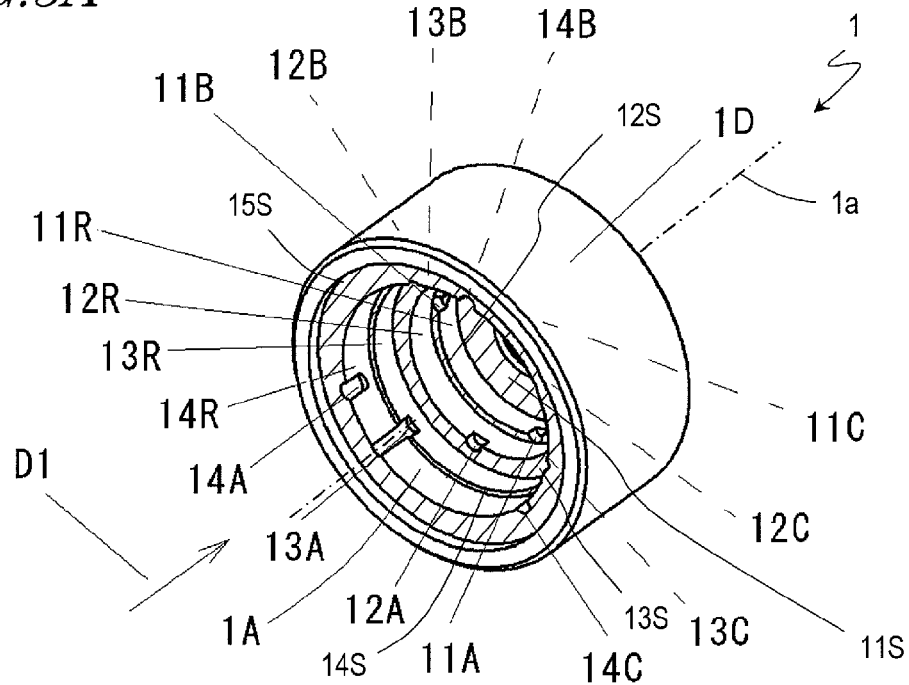
FIG. 3A is a perspective view illustrating a barrel according to the first preferred embodiment.
Figure 3B:
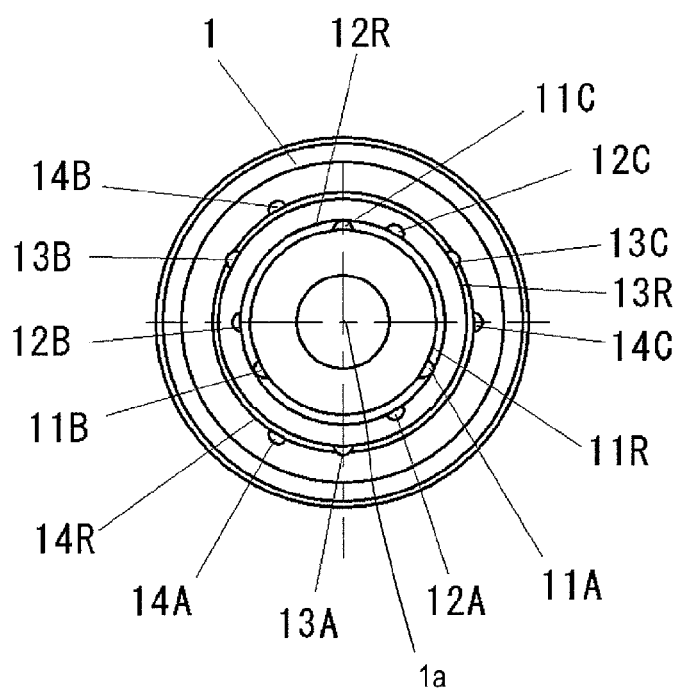
FIG. 3B is a plan view of the barrel of the first preferred embodiment as viewed in the direction indicated by the arrow D1 shown in FIG. 3A.

FIG. 3A is a perspective view of the barrel 1. FIG. 3B is a plan view of the barrel 1 as viewed in the direction indicated by the arrow D1 shown in FIG. 3A (i.e., from over the second opening 1A). As shown in FIGS. 2B, 3A and 3B, the barrel 1 has first, second, third and fourth inner side surface portions 11R, 12R, 13R and 14R, which are arranged parallel to the center axis 1a of the inner space 1C to define cross sections corresponding to the projections of the first, second, third and fourth lenses 21, 22, 23 and 24, respectively. Each of these inner side surface portions is either a curved surface or a set of planes that is/are arranged parallel to the center axis 1a.

In each pair of adjacent ones of these inner side surface portions, one of the two portions located closer to the second opening 1A has a greater cross section than the other portion located closer to the first opening 1B. As used herein, if one inner side surface portion "has a greater cross section than"

the other inner side surface portion, it means that the cross section of the smaller inner side surface portion is totally included within that of the larger one. Specifically, the cross section of the fourth inner side surface portion 14R is greater than that of the third one 13R. In the same way, the cross section of the third inner side surface portion 13R is greater than that of the second one 12R. And the cross section of the second inner side surface portion 12R is greater than that of the first one 11R.

The cross section of each inner side surface portion is slightly greater than the projection of its associated lens. That is to say, a gap is left between the side surface of each lens and its associated inner side surface portion so that the lens can be moved within a plane that intersects with the optical axis at right angles so as to have its position adjusted. The magnitude of that gap is determined with the degree of eccentricity of each lens taken into account.

As can be seen easily from FIG. 2B, the first, second, third and fourth lenses 21, 22, 23 and 24 are held in the inner space 1C so as to adjoin the first, second, third and fourth inner side surface portions 11R, 12R, 13R and 14R, respectively.

A first flange surface 11S, which defines a plane that intersects with the center axis 1a at right angles, is arranged to surround the first opening 1B of the barrel 1. The first flange surface 11S contacts with the contacting surface 21T of the first lens 21, thereby positioning the first lens 21 in the direction that is parallel to the center axis 1a.

In addition, second, third, fourth and fifth flange surfaces 12S, 13S, 14S and 15S are further arranged as respective planes that intersect with the center axis 1a at right angles between the first and second inner side surface portions 11R and 12R, between the second and third inner side surface portions 12R and 13R, between the third and fourth inner side surface portions 13R and 14R, and at the end of the fourth inner side surface portion 14R that faces the second opening 1A, respectively. The second flange surface 12S connects the first and second inner side surface portions 11R and 12R together. In the same way, the third flange surface 13S connects the second and third inner side surface portions 12R and 13R together. And the fourth flange surface 14S connects the third and fourth inner side surface portions 13R and 14R together. In FIG. 3A, these flange surfaces are shadowed so that the reader can see easily where they are.

The first, second, third and fourth lenses 21, 22, 23 and 24 are held in the inner space 1C of the barrel 1 so that each pair of adjacent lenses are in contact with each other. In this manner, the second, third and fourth lenses 22, 23 and 24 are positioned in the direction that is parallel to the center axis 1a. In this case, the contact between the first positioning surface 11S and the contacting surface 21T and the contact between each pair of adjacent ones of the first, second, third and fourth lenses 21, 22, 23 and 24 are preferably either a plane contact or a three-point contact, to say the least, so that contact can be maintained between them with good stability.

As shown clearly in FIGS. 3A and 3B, the barrel 1 has a number of main grooves, which have been cut on the first, second, third and fourth inner side surface portions 11R, 12R, 13R and 14R so as to run from the first opening 1B toward the second opening 1A and which are preferably parallel to the center axis 1a. Specifically, the first inner side surface portion 11R has main grooves (1A), (1B) and (1C), which are identified by the reference numerals 11A, 11B and 11C, respectively. Likewise, the second inner side surface portion 12R has main grooves (2A), (2B) and (2C), which are identified by the reference numerals 12A, 12B and 12C, respectively. The third inner side surface portion 13R has main grooves (3A), (3B) and (3C), which are identified by the reference numerals 13A, 13B and 13C, respectively. And the fourth inner side surface portion 14R has main grooves (4A), (4B) and (4C), which are identified by the reference numerals 14A, 14B and 14C, respectively.

The main grooves (1A) 11A, (1B) 11B and (1C) 11C of the first inner side surface portion 11R have reached the second flange surface 12S to make notches at the second flange surface 12S, thereby cutting three holes through the second flange surface 12S. Likewise, the main grooves of the second inner side surface portion 12R have reached the third flange surface 13S to make notches at the third flange surface 13S, thereby cutting three holes through the third flange surface 13S. The respective main grooves of the third and fourth inner side surface portions 13R and 14R also have the same structure.

In this preferred embodiment, each inner side surface portion is supposed to have three main grooves. However, it is just necessary to provide a number of main grooves for each inner side surface portion, and it does not matter exactly how many. Thus, each inner side surface portion may also have only two main grooves or four or more grooves as well. Optionally, the number of main grooves may even vary from one inner side surface portion to another. As shown in FIG. 3A, none of these main grooves reach the outer side surface of the barrel 1. In other words, the outer side surface 1D and the inner space 1C never communicate with each other via any of these main grooves. That is why no external light will enter the inner space 1C from outside of the barrel 1 and affect the optical properties adversely.

As will be described in detail later, these main grooves are used to form spaces to introduce an adjustment jig for adjusting the position of each lens when the first, second, third and fourth lenses 21, 22, 23 and 24 are bonded onto the barrel 1. In addition, those main grooves also function as air paths for letting the air go from a closed space to be formed between the inserted lens and the barrel. On top of that, the main grooves further provide spaces to be filled with an adhesive that bonds the barrel 1 and the lenses together. By cutting these main grooves on the respective inner side surface portions, an adjustment jig for adjusting the lens position can be inserted from two or more directions, and therefore, the lens position can be adjusted more precisely. Also, by using those main grooves as a sort of adhesive pool, the lenses can be bonded securely to the barrel 1 at multiple points.

Furthermore, the grooves of each inner side surface portion cut holes through its associated flange surface. That is why if this lens unit is assembled by inserting the respective lenses into the inner space 1C with the barrel 1 held so that its center axis 1a runs perpendicularly, the adhesive needs to be dripped perpendicularly into each and every groove. That is to say, the adhesive can be dripped in the same direction everywhere. Consequently, the adhesive is dripped into the respective grooves under the same condition, and therefore, the lenses can be bonded with good stability.

As can be seen easily from FIG. 3B, when defined with respect to the center axis 1a, the azimuths of the main grooves of each inner side surface portion are preferably different from those of the main grooves of any other one of the inner side surface portions. Specifically, when viewed along the center axis 1a, in the direction in which the main groove (1A) 11A of the first inner side surface portion 11R is located, there are no other main grooves of the second, third or fourth inner side surface portion 12R, 13R or 14R. By arranging the main grooves of the respective inner side surface portions in this manner, the stress to be produced by shrinkage of the adhesive that fills the main grooves with will disperse on a number of planes that intersect with the center axis 1a of the barrel 1 at right angles. As a result, no strain will be produced in the barrel 1.

Also, in each inner side surface portion, the main grooves are preferably arranged at regular angular intervals around the center axis 1a. For example, if three main grooves are provided for each inner side surface portion as shown in FIG. 3B, then those main grooves are preferably arranged at regular intervals of 120 degrees in each inner side surface portion. Then, the stress to be caused by the adhesive that fills the main grooves with on each lens will be dispersed uniformly with respect to the center axis 1a, thus preventing strain from being produced in any of those lenses.

In that case, the main grooves (1A) 11A, (2A) 12A, (3A) 13A and (4A) 14A are more preferably arranged at regular intervals of 30 degrees. Then, not only the stress caused on the respective lenses but also the stress produced in the barrel 1 can be dispersed uniformly as well. Consequently, even if the lens unit should be used in an environment where a significant temperature variation could arise, the stress caused by that temperature variation would be dispersed uniformly and the optical properties would hardly vary.

Furthermore, as shown in FIG. 3B, the spaces to be produced by those main grooves of each inner side surface portion adjacent to the side surface of its associated lens preferably have substantially equal volumes. In that case, as will be described later, the respective main grooves will be filled with substantially the same amount of adhesive, and therefore, it will take almost the same amount of time to cure the adhesive at any of those main grooves. On top of that, the respective main grooves will be filled with substantially the same amount of adhesive. That is why the adhesive that has been injected into the respective main grooves will cause the same degree of stress everywhere on the barrel 1 and on the respective lenses when it cures and shrinks. As a result, the stress can be dispersed even more uniformly.

Also, in each inner side surface portion, one end of each of its main grooves, which is closer to the first opening 1B, is preferably located between the two contacting surfaces of its associated lens in the direction in which the center axis 1a of the barrel 1 extends. For example, as shown in FIG. 2B, the one end 11EA of the main groove (1A) 11A of the first inner side surface portion 11R, which is closer to the first opening 1B, is located between the two contacting surfaces 21T and 21S (i.e., the two principal surfaces) of the first lens 21 in the direction in which the center axis 1a of the barrel 1 extends. It is preferred that the other main grooves (1B) 11B and (1C) 11C of the first inner side surface portion 11R also have the same structure. Likewise, each and every main groove of the other second, third and fourth inner side surface portions 12R, 13R and 14R also preferably has the same structure. With such a structure adopted, it is possible to prevent the adhesive that has been introduced into the main groove from reaching the effective area of the lens by way of one of its contacting surfaces and affecting the optical property of the lens seriously.

As described above, in the lens unit of this preferred embodiment, the respective lenses inserted into the barrel 1 can be highly precisely aligned with each other, and the lenses can be bonded onto the barrel 1 under the same condition at every bonding portion. As a result, a lens unit that can align the lenses highly precisely with each other and that will realize excellent optical properties is provided.

Hereinafter, it will be described how to assemble the lens unit 201.

Figure 4A:
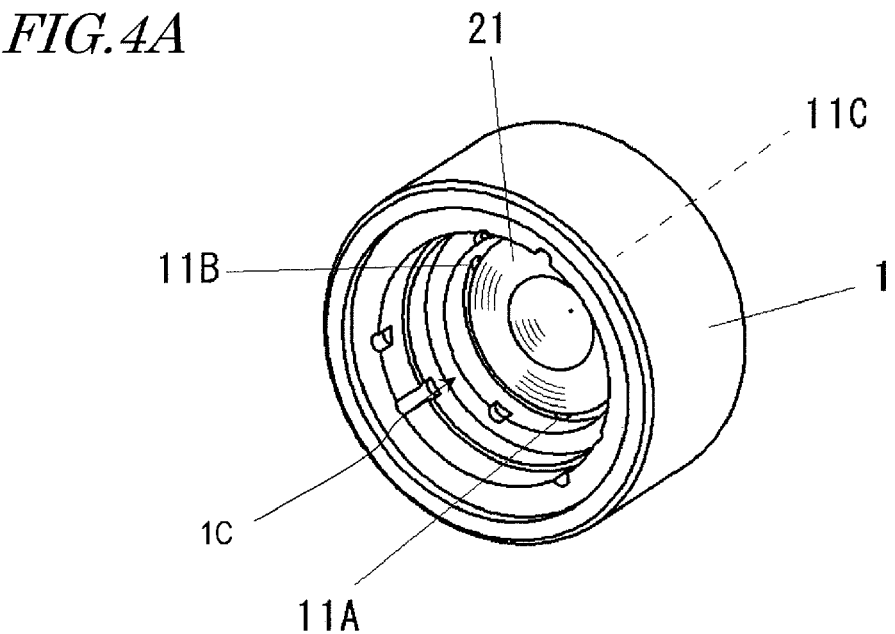
FIG. 4A is a perspective view illustrating how the barrel looks when a first lens is fitted into it according to the first preferred embodiment.
Figure 4B:
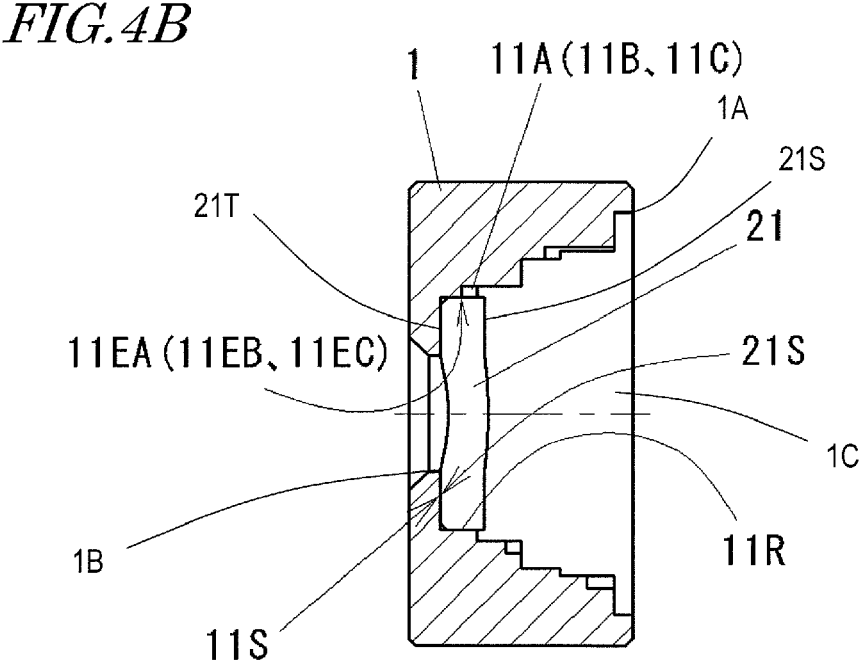
FIG. 4B is a cross-sectional view illustrating how the barrel looks when a first lens is fitted into it according to the first preferred embodiment.
Figure 5A:
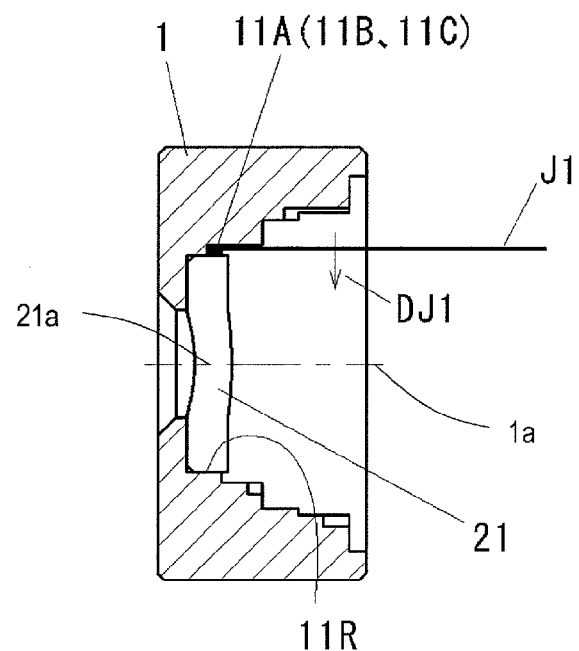
FIG. 5A is a cross-sectional view illustrating how to adjust the position of the first lens that has been fitted into the barrel, according to the first preferred embodiment.

First of all, as shown in FIGS. 4A and 4B, the first lens 21 is inserted along the inner side surface portion 11R of the barrel 1 to the bottom of the barrel 1, thereby making the contacting surface 21T of the first lens 21 contact with the first flange surface 11S. As there will be a narrow gap left between the outer side surface of the first lens 21 and the first inner side surface portion 11R when the first lens 21 is inserted, a first adjustment jig J1 is inserted into the main grooves (1A) 11A, (1B) 11B and (1C) 11C as shown in FIG. 5A, thereby adjusting the position of the first lens 21. In this case, while monitoring the light reflected from any of the lens surfaces using an instrument such as an auto-collimator, the first adjustment jig J1 that has been inserted into the main grooves (1A) 11A, (1B) 11B and (1C) 11C is moved and balanced independently of each other in the direction indicated by the arrow DJ1 so as to minimize the degree of eccentricity of the optical axis 21a of the first lens 21 with respect to the center axis 1a of the barrel 1.

Figure 5B:
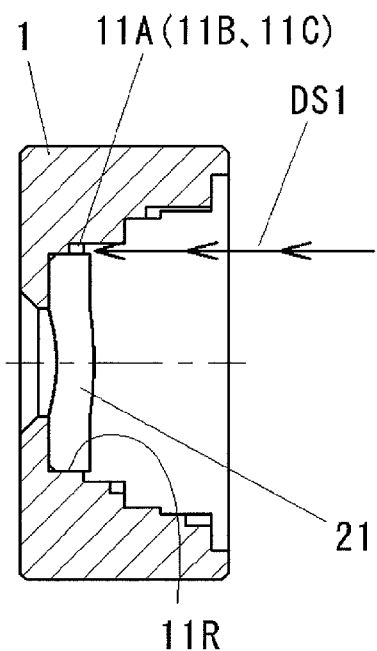
FIG. 5B is a cross-sectional view illustrating how to bond the first lens to the barrel, according to the first preferred embodiment.

When the position of the first lens 21 is determined, an adhesive is injected into those three main grooves in the direction indicated by the arrow DS1 as shown in FIG. 5B and then cured, thereby fixing the first lens 21 onto the barrel 1. In this case, the adhesive can fill securely those spaces that have been produced between the main grooves (1A) 11A, (1B) 11B and (1C) 11C and the outer side surface of the first lens 21. Consequently, the first lens 21 can be securely bonded onto the barrel 1 with the adhesive used at predetermined positions.

In this process step, a UV curable adhesive, a thermosetting adhesive or any other suitable adhesive may be selectively used according to the condition required. However, if a UV curable adhesive is used, the lens position can be adjusted freely until the adhesive is irradiated with an UV ray and the adhesive will cure hard once exposed to the UV ray. That is why even if lenses are inserted and adjusted one after another as soon as the previous one has been bonded, the lenses can still be bonded securely without varying their adjusted positions.

On top of that, one end 11EA, 11EB, 11EC of each of the main grooves (1A) 11A, (1B) 11B and (1C) 11C, which is closer to the first opening 11B, is located between the two contacting surfaces 21T and 21S of the first lens 21 in the direction in which the center axis 1a of the barrel 1 extends as shown in FIG. 4B. Thus, it is possible to prevent the adhesive that has been injected into the main grooves (1A) 11A, (1B) 11B and (1C) 11C from reaching the effective area of the lens by way of the contacting surface 21T of the first lens 21.

Figure 6A:
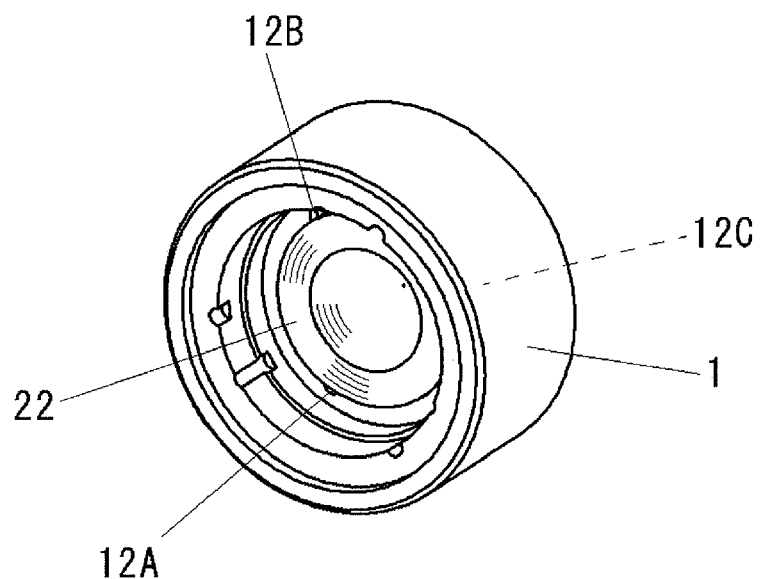
FIG. 6A is a perspective view illustrating how the barrel looks when a second lens is fitted into it according to the first preferred embodiment.
Figure 6B:
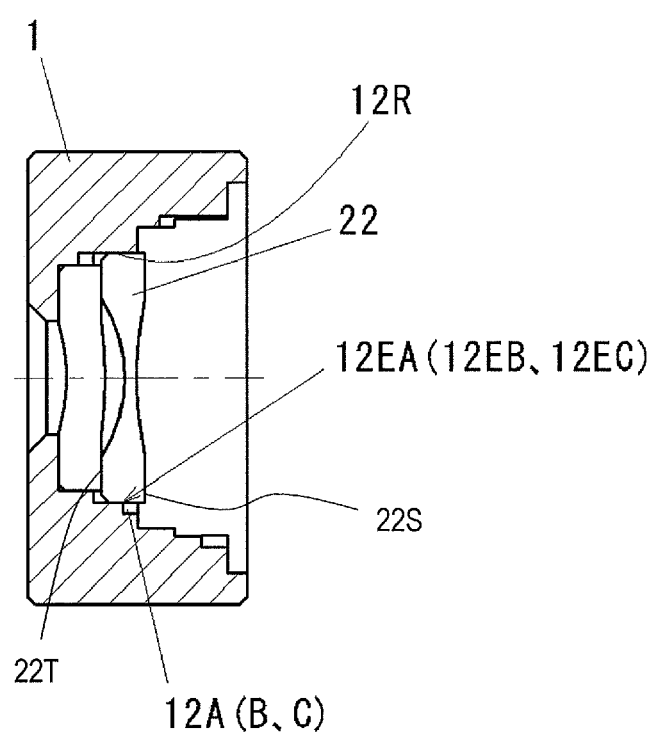
FIG. 6B is a cross-sectional view illustrating how the barrel looks when a second lens is fitted into it according to the first preferred embodiment.
Figure 7:
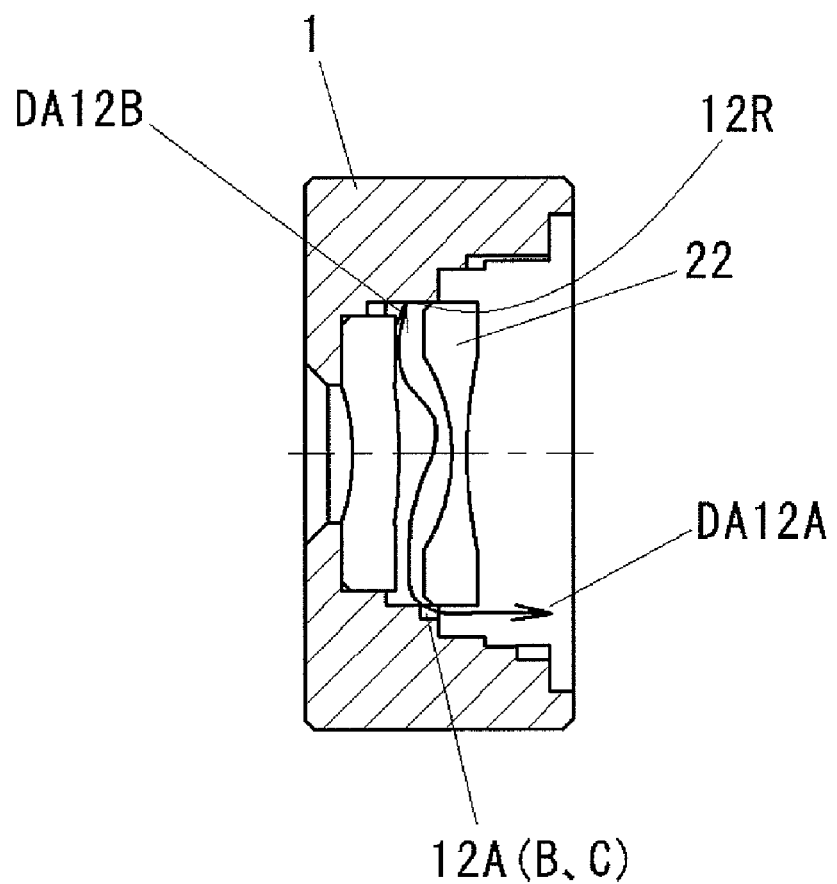
FIG. 7 is a conceptual cross-sectional view illustrating how the air leaks when the second lens is fitted into the barrel according to the first preferred embodiment.

Next, as shown in FIGS. 6A and 6B, the second lens 22 is inserted in the same way along the second inner side surface portion 12R into the inner space 1C of the barrel 1 until the second lens 22 contacts with the first lens 21. In this process step, as the second lens 22 is inserted deeper, the air is more and more compressed between the first and second lenses 21 and 22 as shown in FIG. 7. In this case, the air flowing in the direction indicated by the arrow DA12B is stopped by the second inner side surface portion 12R, while the air flowing in the direction indicated by the arrow DA12A can leak out of this space through the main grooves (2A) 12A, (2B) 12B and (2C) 12C. That is why the flow of the air enclosed between the first and second lenses 21 and 22 is certainly interrupted by the second inner side surface portion 12R but those three main grooves can function as air paths for letting the compressed air get out of that enclosed space. Consequently, it is possible to avoid an unwanted situation where the repulsive force produced when the second lens 22 is inserted into the barrel 1 pushes the second lens 22 backward (i.e., opposite to the insertion direction of the second lens 22) and makes it difficult to get the assembling process done just as intended.

Figure 8A:
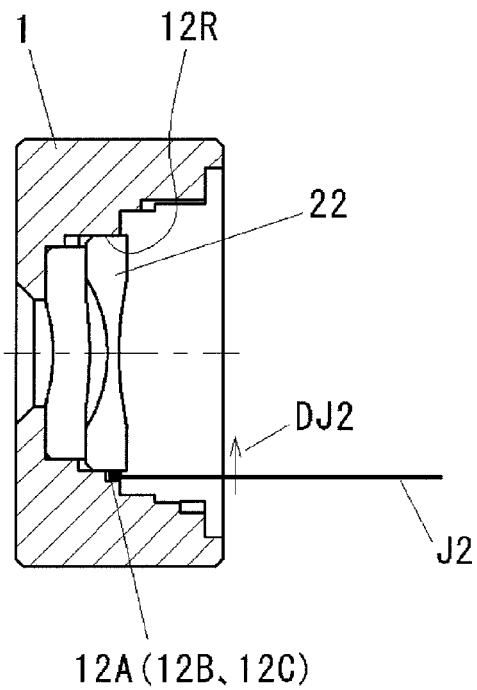
FIG. 8A is a cross-sectional view illustrating how to adjust the position of the second lens that has been fitted into the barrel, according to the first preferred embodiment.
Figure 8B:
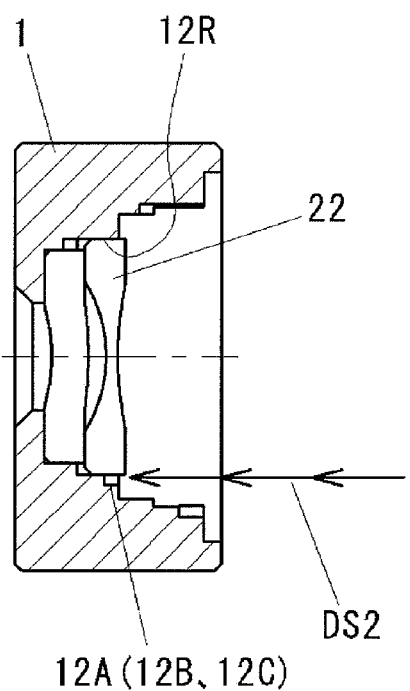
FIG. 8B is across-sectional views illustrating how to bond the second lens to the barrel, according to the first preferred embodiment.

Next, as shown in FIG. 8A, a second adjustment jig J2 is inserted into the main grooves (2A) 12A, (2B) 12B and (2C) 12C, thereby adjusting the position of the second lens 22 just as when the first lens 21 was adjusted. Thereafter, as shown in FIG. 8B, an adhesive is injected into those three main grooves in the direction indicated by the arrow DS2 and then cured, thereby fixing the second lens 22 onto the barrel 1. In this case, the adhesive can fill securely those spaces that have been produced between the main grooves (2A) 12A, (2B) 12B and (2C) 12C and the outer side surface of the second lens 22. Consequently, the second lens 22 can be securely bonded onto the barrel 1 with the adhesive used at predetermined positions.

On top of that, one end 12EA, 12EB, 12EC of each of the main grooves (2A) 12A, (2B) 12B and (2C) 12C, which is closer to the first opening 11B, is located between the two contacting surfaces 22T and 22S of the second lens 22 in the direction in which the center axis 1a of the barrel 1 extends as shown in FIG. 6B. Thus, it is possible to prevent the adhesive that has been injected into the main grooves (2A) 12A, (2B) 12B and (2C) 12C from reaching the effective area of the lens by way of the contacting surface 22T of the second lens 22.

Figure 9A:
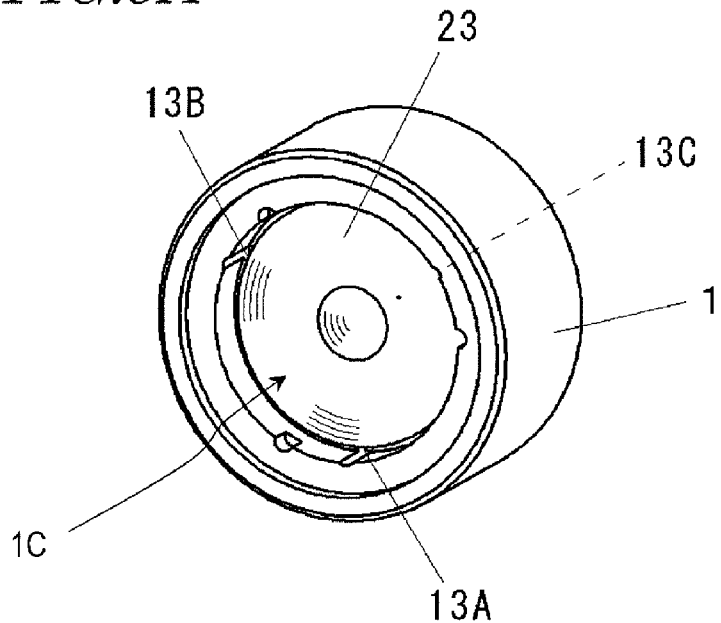
FIG. 9A is a perspective view illustrating how the barrel looks when a third lens is fitted into it according to the first preferred embodiment.
Figure 9B:
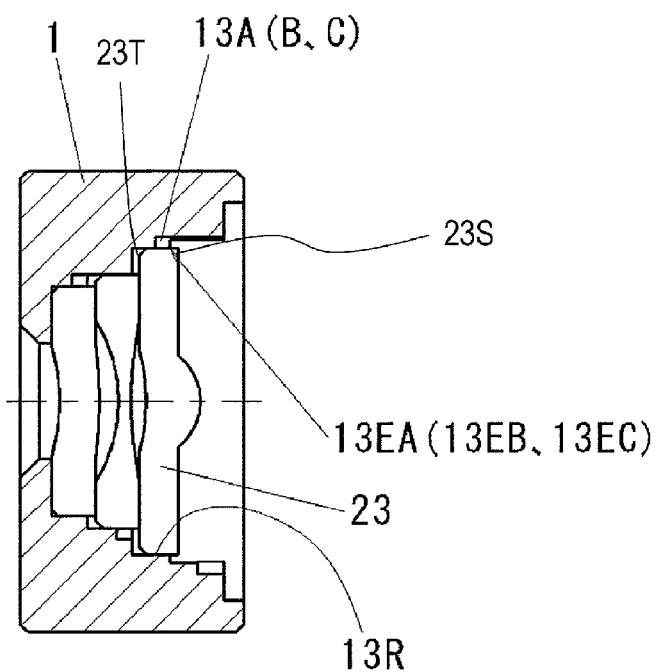
FIG. 9B is a cross-sectional view illustrating how the barrel looks when a third lens is fitted into it according to the first preferred embodiment.
Figure 10:
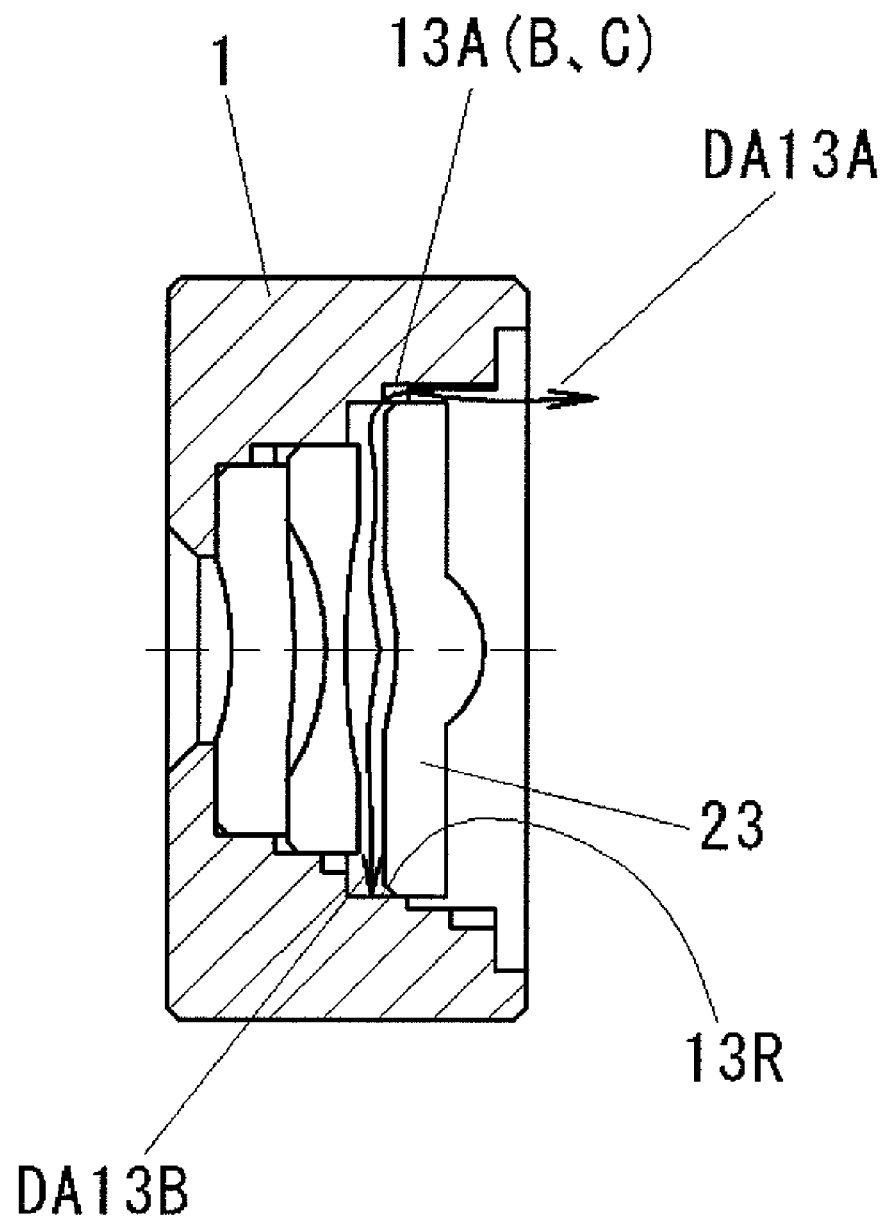
FIG. 10 is a conceptual cross-sectional view illustrating how the air leaks when the third lens is fitted into the barrel according to the first preferred embodiment.

Next, as shown in FIGS. 9A and 9B, the third lens 23 is inserted in the same way along the third inner side surface portion 13R into the inner space 1C of the barrel 1 until the third lens 23 contacts with the second lens 22. In this process step, as the third lens 23 is inserted deeper, the air is more and more compressed between the second and third lenses 22 and 23 as shown in FIG. 10. In this case, the air flowing in the direction indicated by the arrow DA13B is stopped by the third inner side surface portion 13R, while the air flowing in the direction indicated by the arrow DA13A can leak out of this space through the main grooves (3A) 13A, (3B) 13B and (3C) 13C. That is why the flow of the air enclosed between the second and third lenses 22 and 23 is certainly interrupted by the third inner side surface portion 13R but those three main grooves can function as air paths for letting the compressed air get out of that enclosed space. Consequently, it is possible to avoid an unwanted situation where the repulsive force produced when the third lens 23 is inserted into the barrel 1 pushes the third lens 23 backward (i.e., opposite to the insertion direction of the third lens 23) and makes it difficult to get the assembling process done just as intended.

Figure 11A:
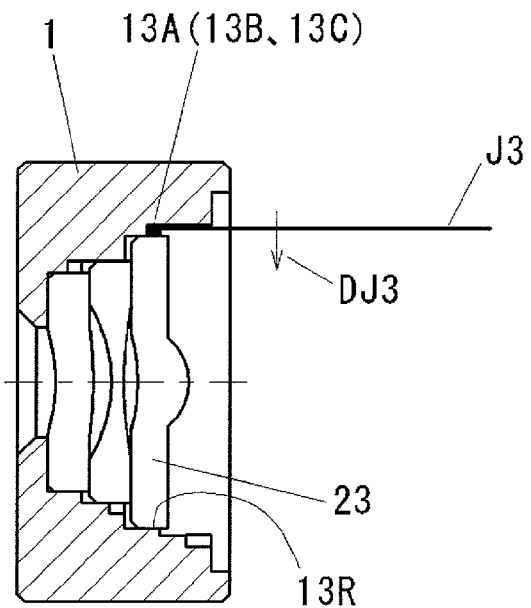
FIG. 11A is a cross-sectional view illustrating how to adjust the position of the third lens that has been fitted into the barrel, according to the first preferred embodiment.
Figure 11B:
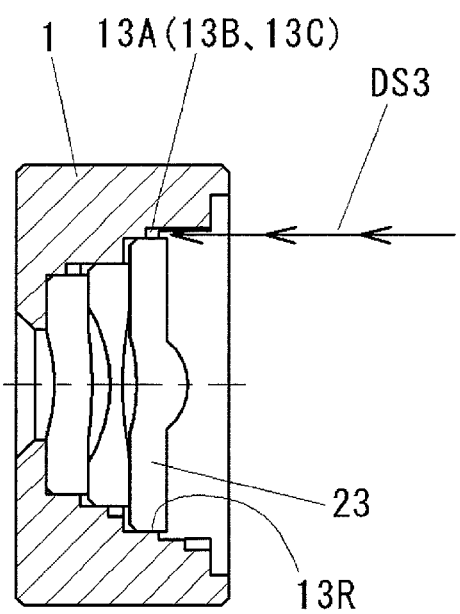
FIG. 11B is a cross-sectional view illustrating how to bond the third lens to the barrel, according to the first preferred embodiment.

Next, as shown in FIG. 11A, a third adjustment jig J3 is inserted into the main grooves (3A) 13A, (3B) 13B and (3C) 13C, thereby adjusting the position of the third lens 23 just as when the first lens 21 was adjusted. Thereafter, as shown in FIG. 11B, an adhesive is injected into those three main grooves in the direction indicated by the arrow DS3 and then cured, thereby fixing the third lens 23 onto the barrel 1. In this case, the adhesive can fill securely those spaces that have been produced between the main grooves (3A) 13A, (3B) 13B and (3C) 13C and the outer side surface of the third lens 23. Consequently, the third lens 23 can be securely bonded onto the barrel 1 with the adhesive used at predetermined positions.

On top of that, one end 13EA, 13EB, 13EC of each of the main grooves (3A) 13A, (3B) 13B and (3C) 13C, which is closer to the first opening 11B, is located between the two contacting surfaces 23T and 23S of the third lens 23 in the direction in which the center axis 1a of the barrel 1 extends as shown in FIG. 9B. Thus, it is possible to prevent the adhesive that has been injected into the main grooves (3A) 13A, (3B) 13B and (3C) 13C from reaching the effective area of the lens by way of the contacting surface 23T of the third lens 23.

Figure 12:
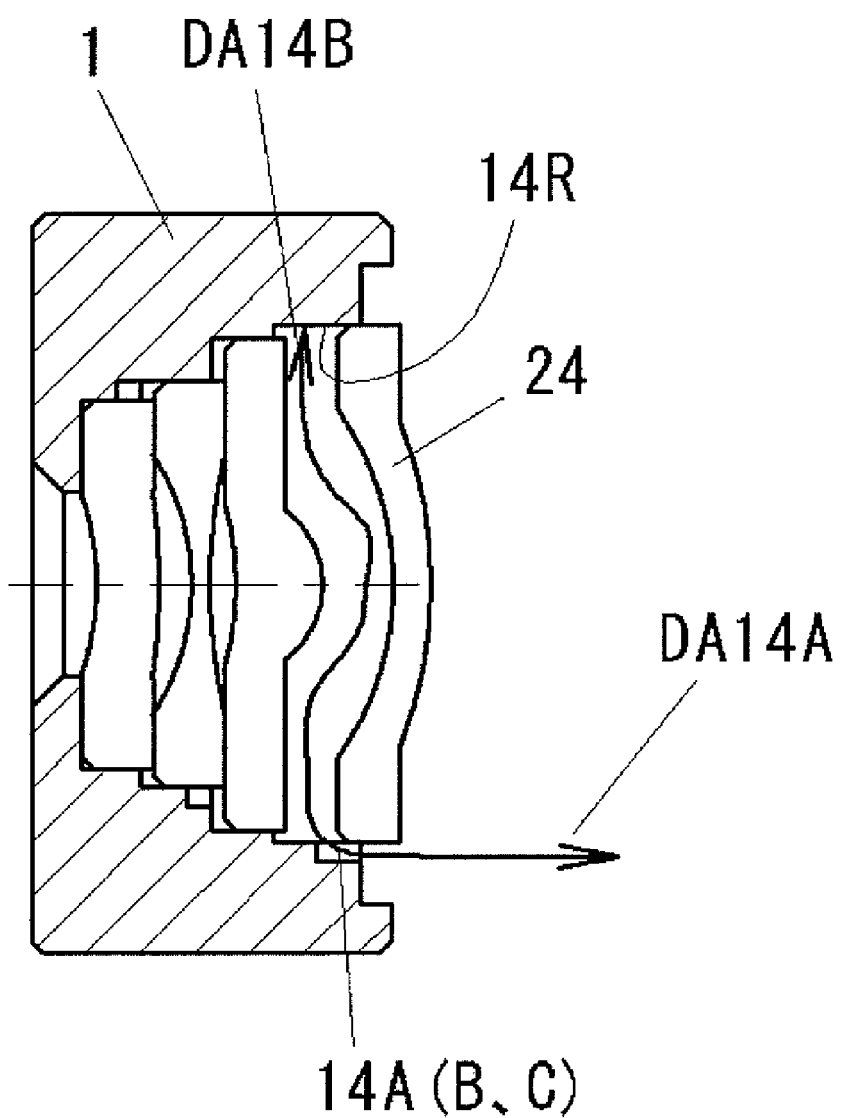
FIG. 12 is a conceptual cross-sectional view illustrating how the air leaks when a fourth lens is fitted into the barrel according to the first preferred embodiment.

Next, as shown in FIGS. 2A and 2B, the fourth lens 24 is inserted in the same way along the fourth inner side surface portion 14R into the inner space 1C of the barrel 1 until the fourth lens 24 contacts with the third lens 23. In this process step, as the fourth lens 24 is inserted deeper, the air is more and more compressed between the third and fourth lenses 23 and 24 as shown in FIG. 12. In this case, the air flowing in the direction indicated by the arrow DA14B is stopped by the fourth inner side surface portion 14R, while the air flowing in the direction indicated by the arrow DA14A can leak out of this space through the main grooves (4A) 14A, (4B) 14B and (4C) 14C. That is why the flow of the air enclosed between the third and fourth lenses 23 and 24 is certainly interrupted by the fourth inner side surface portion 14R but those three main grooves can function as air paths for letting the compressed air get out of that enclosed space. Consequently, it is possible to avoid an unwanted situation where the repulsive force produced when the fourth lens 24 is inserted into the barrel 1 pushes the fourth lens 24 backward (i.e., opposite to the insertion direction of the fourth lens 24) and makes it difficult to get the assembling process done just as intended.

Figure 13A:
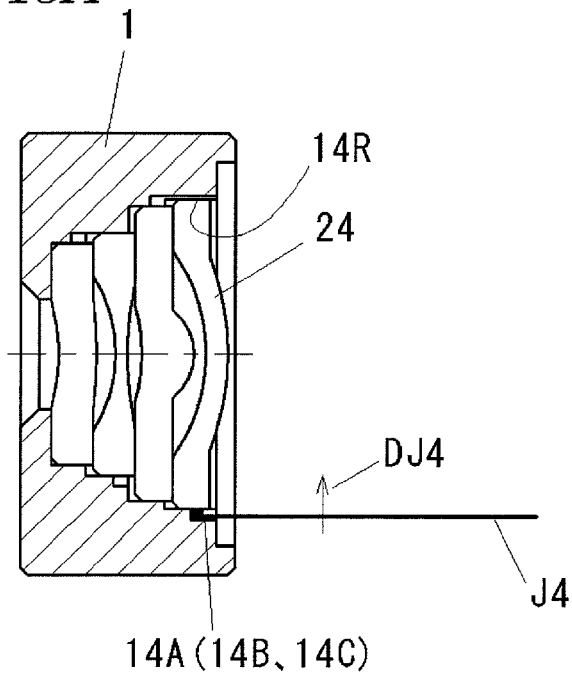
FIG. 13A is a cross-sectional view illustrating how to adjust the position of the fourth lens that has been fitted into the barrel, according to the first preferred embodiment.
Figure 13B:
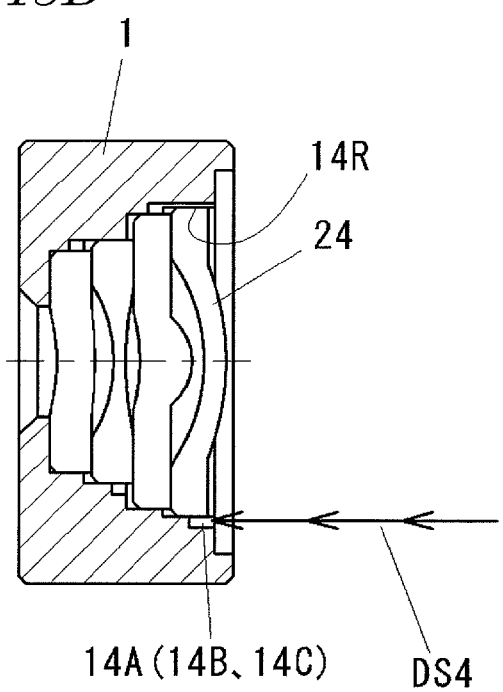
FIG. 13B is a cross-sectional view illustrating how to bond the fourth lens to the barrel, according to the first preferred embodiment.

Next, as shown in FIG. 13A, a fourth adjustment jig J4 is inserted into the main grooves (4A) 14A, (4B) 14B and (4C) 14C, thereby adjusting the position of the fourth lens 24 just as when the first lens 21 was adjusted. Thereafter, as shown in FIG. 13B, an adhesive is injected into those three main grooves in the direction indicated by the arrow DS4 and then cured, thereby fixing the fourth lens 24 onto the barrel 1. In this case, the adhesive can fill securely those spaces that have been produced between the main grooves (4A) 14A, (4B) 14B and (4C) 14C and the outer side surface of the fourth lens 24. Consequently, the fourth lens 24 can be securely bonded onto the barrel 1 with the adhesive used at predetermined positions.

On top of that, one end 14EA, 14EB, 14EC of each of the main grooves (4A) 14A, (4B) 14B and (4C) 14C, which is closer to the first opening 11B, is located between the two contacting surfaces 24T and 24S of the fourth lens 24 in the direction in which the center axis 1a of the barrel 1 extends as shown in FIG. 2B. Thus, it is possible to prevent the adhesive that has been injected into the main grooves (4A) 14A, (4B) 14B and (4C) 14C from reaching the contacting surface 24T of the fourth lens 24. In this manner, the lens unit 201 is completed.

As described above, in this lens unit 201, main grooves of each set are arranged at regular angular intervals with respect to its associated lens, and therefore, a well-balanced bond strength can be maintained around the optical axis of the lens. That is why even if the cylindrical portion of barrel 1 were slightly pulled toward the lens being bonded, the barrel 1 would still be deformed evenly over its entire periphery. Consequently, deterioration in the optical properties of the lens unit assembled would be minimum even in that case. On top of that, if the spaces to be filled with the adhesive, which have been produced by each set of main grooves and the outer side surface of its associated lens, have substantially equal volumes, then the adhesive force can be produced even more evenly.

Furthermore, none of the main grooves reach the outer side surface 1D, and therefore, a lens unit that will achieve those various effects is provided without letting unnecessary light enter the barrel 1.

Embodiment 2

Figure 14A:
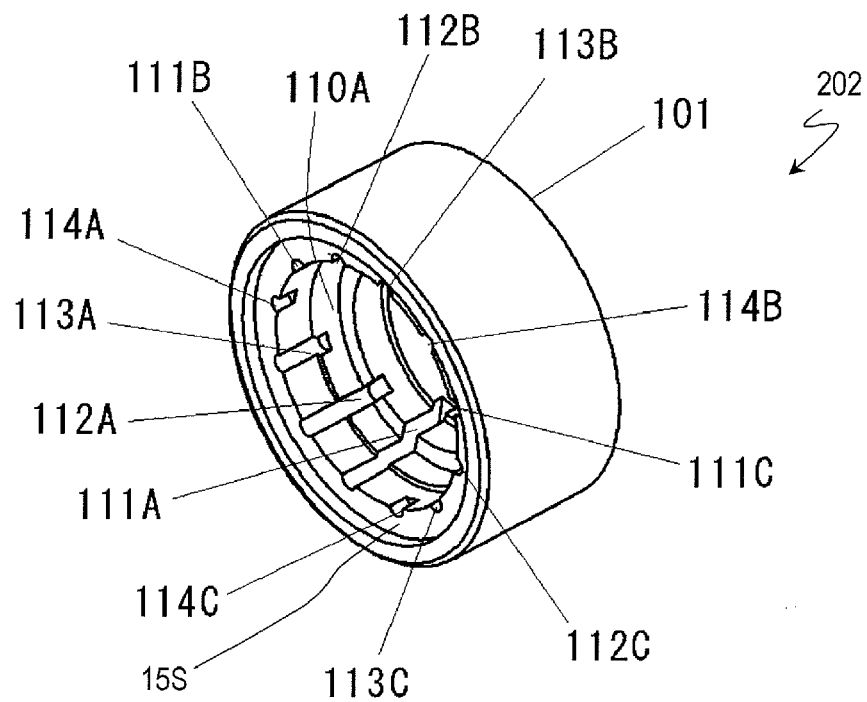
FIG. 14A is a perspective view illustrating a second preferred embodiment of a lens unit according to the present invention.
Figure 14B:
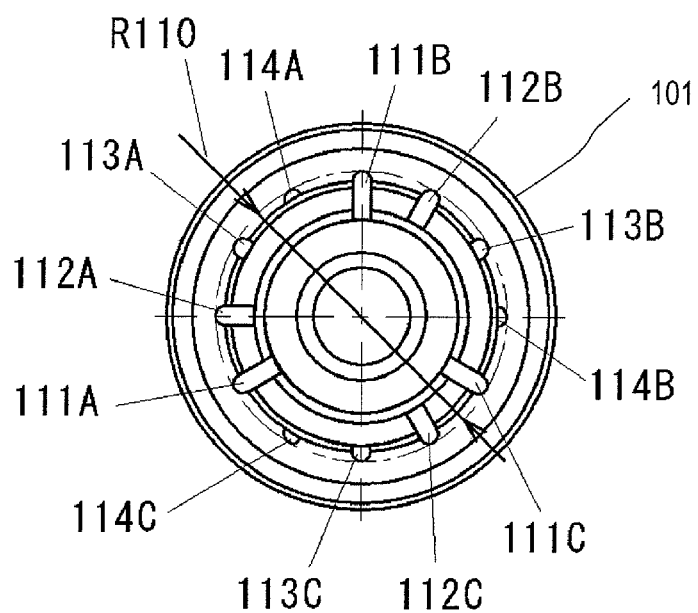
FIG. 14B is a plan view illustrating a second preferred embodiment of a lens unit according to the present invention.

Hereinafter, a second specific preferred embodiment of a lens unit according to the present invention will be described. FIG. 14A is a perspective view illustrating the barrel 101 of the lens unit 202 of the second preferred embodiment, and FIG. 14B is a plan view of the barrel 101 as viewed from over its second opening 1A.

In the first preferred embodiment of the present invention described above, in the main grooves (1A) 11A, (1B) 11B, (1C) 11C, (2A) 12A, (2B) 12B, (2C) 12C, (3A) 13A, (3B) 13B, (3C) 13C, (4A) 14A, (4B) 14B, and (4C) 14C that have been cut on the barrel 1, the distances from the respective bottoms of those main grooves to the center axis 1a of the barrel 1 are different from each other. On the other hand, in the barrel 101 of this lens unit 202, the distances from the respective bottoms of main grooves (1A) 111A, (1B) 111B, (1C) 111C, (2A) 112A, (2B) 112B, (2C) 112C, (3A) 113A, (3B) 113B, (3C) 113C, (4A) 114A, (4B) 114B, and (4C) 114C that have been cut on the barrel 101 to the center axis 1a of the barrel 101 are equal to each other as shown in FIG. 14B. That is to say, the bottom of every main groove is located on the concentric circles, of which the diameter is identified by R110. Also, every main groove reaches a fifth flange surface 15S, which is notched, thereby cutting holes through the fifth flange surface 15S.

In the barrel 101 of this preferred embodiment with such an arrangement, even after the first, second, third and fourth lenses 21, 22, 23 and 24 have all been put into the barrel 101, the holes that have been cut between the barrel 101 and the main grooves (1A) 111A, (1B) 111B, (1C) 111C, (2A) 112A, (2B) 112B, (2C) 112C, (3A) 113A, (3B) 113B, (3C) 113C, (4A) 114A, (4B) 114B, and (4C) 114C are not covered with any of those lenses but are still open on the fifth flange surface 15S. That is why even after every lens has been fit into place, the positions of the first, second and third lenses 21, 22 and 23 that are hidden behind the fourth lens 24 can still be adjusted.

Figure 15:
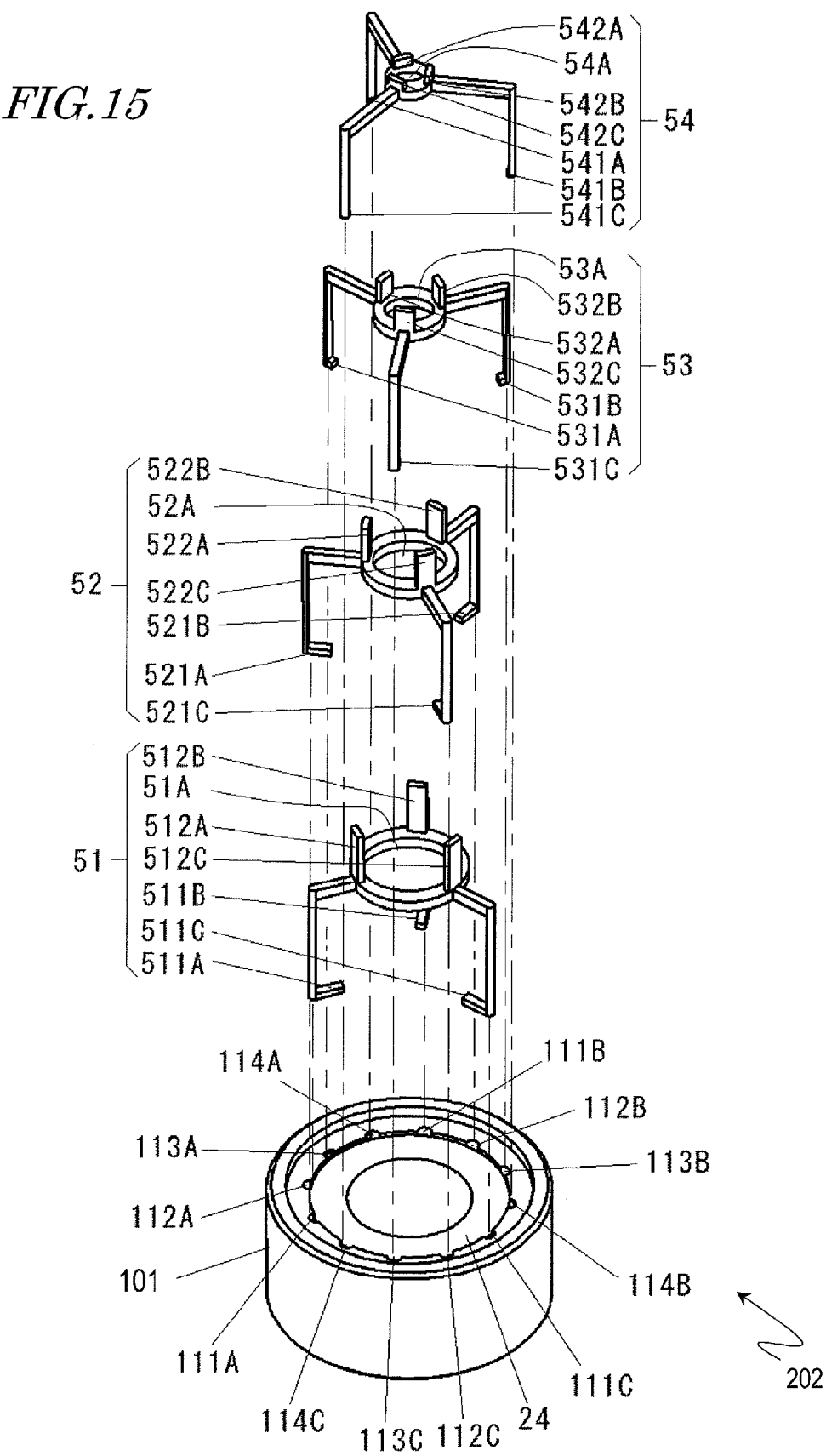
FIG. 15 is a perspective view illustrating first, second, third and fourth tridirectional adjustment jigs for use in the second preferred embodiment.

FIG. 15 illustrates the lens unit 202 into which every lens has already been fit into place and also illustrates first, second, third and fourth tridirectional adjustment jigs 51, 52, 53 and 54 for adjusting the positions of the first, second, third and fourth lenses 21, 22, 23 and 24, respectively, in such a state. As shown in FIG. 15, the first tridirectional adjustment jig 51 has claw portions (1A) 511A, (1B) 511B and (1C) 511C and controlling portions (1A) 512A, (1B) 512B and (1C) 512C. Likewise, the second tridirectional adjustment jig 52 also has claw portions (2A) 521A, (2B) 521B and (2C) 521C and controlling portions (2A) 522A, (2B) 522B and (2C) 522C. The third tridirectional adjustment jig 53 has claw portions (3A) 531A, (3B) 531B and (3C) 531C and controlling portions (3A) 532A, (3B) 532B and (3C) 532C. And the fourth tridirectional adjustment jig 54 has claw portions (4A) 541A, (4B) 541B and (4C) 541C and controlling portions (4A) 542A, (4B) 542B and (4C) 542C. It should be noted that in every tridirectional adjustment jig, the portion that connects their controlling portions and claw portions together is never deformed to the point that the accuracy of adjustment is affected while the degree of eccentricity is being adjusted.

Hereinafter, it will be described how to assemble the lens unit 202 using those tridirectional adjustment jigs.

First of all, the first, second, third and fourth lenses 21, 22, 23 and 24 are inserted into the inner space 1C of the barrel 101 along the first, second, third and fourth inner side surface portions 11R, 12R, 13R and 14R, respectively.

Figure 16:
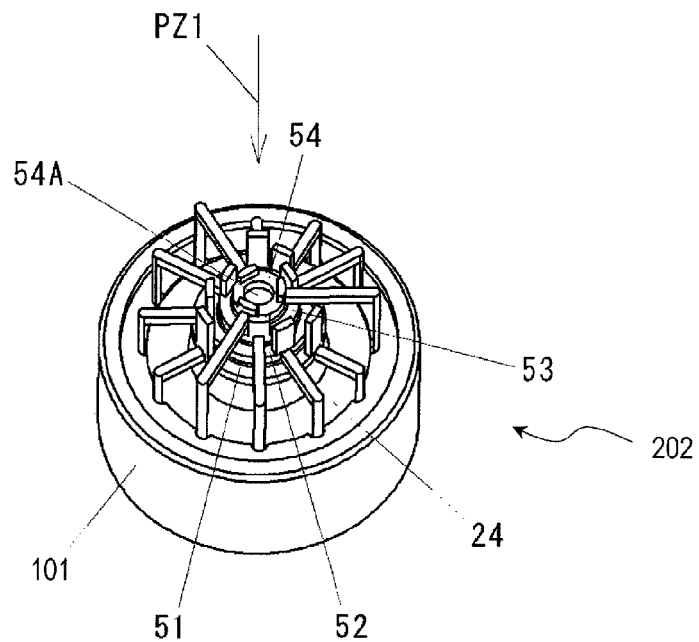
FIG. 16 is a perspective view illustrating how the barrel looks when the first, second, third and fourth tridirectional adjustment jigs are inserted into it according to the second preferred embodiment.
Figure 17:
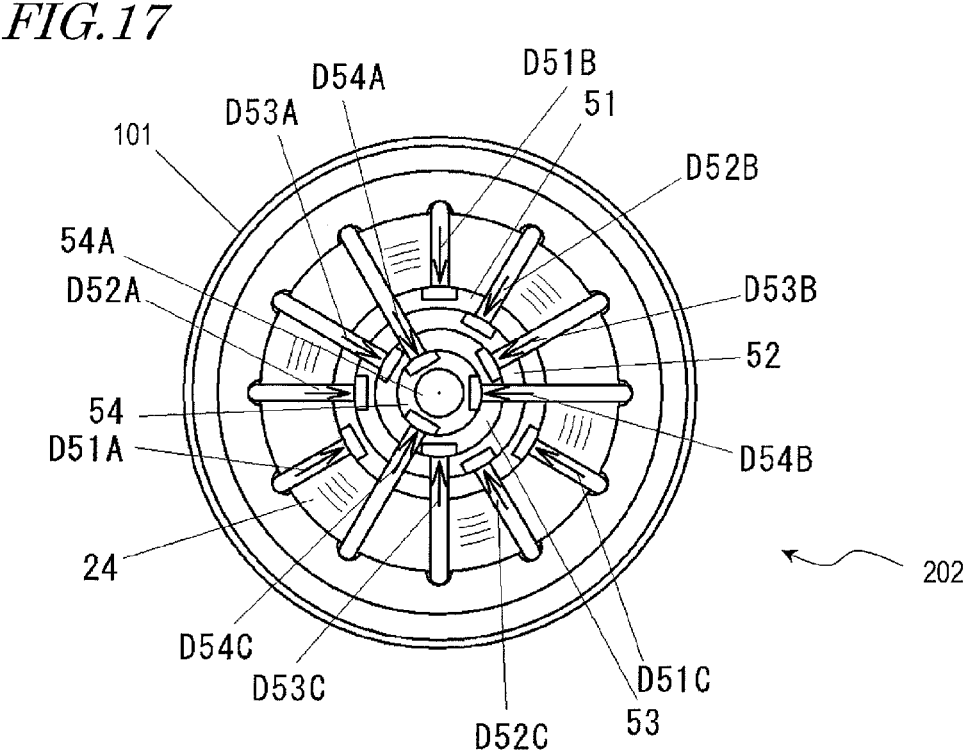
FIG. 17 is a plan view of the barrel of the second preferred embodiment, into which the first, second, third and fourth tridirectional adjustment jigs have already been inserted, as viewed in the direction indicated by the arrow PZI shown in FIG. 16.
Figure 18A:
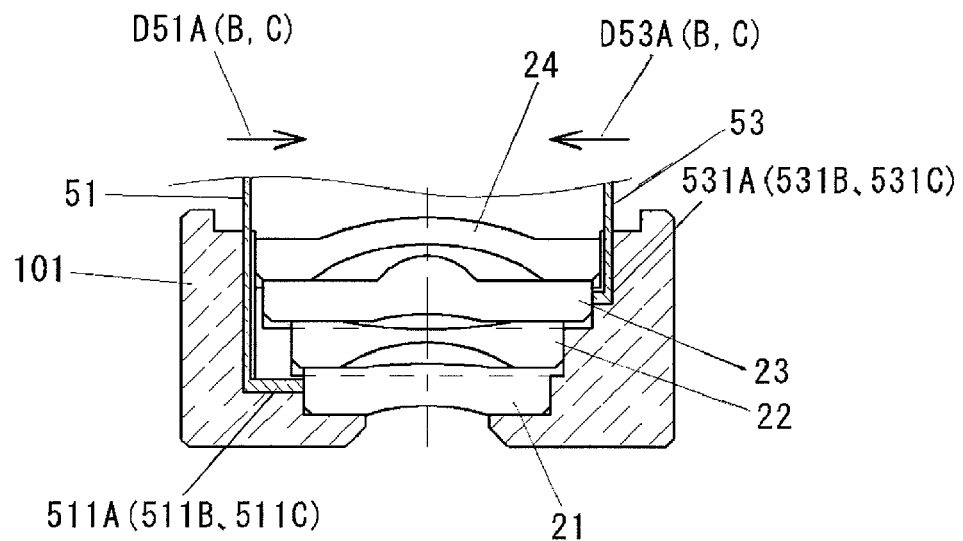
FIG. 18A is a cross-sectional views illustrating how to adjust the positions of the first and third lenses using the first and third tridirectional adjustment jigs according to the second preferred embodiment.
Figure 18B:
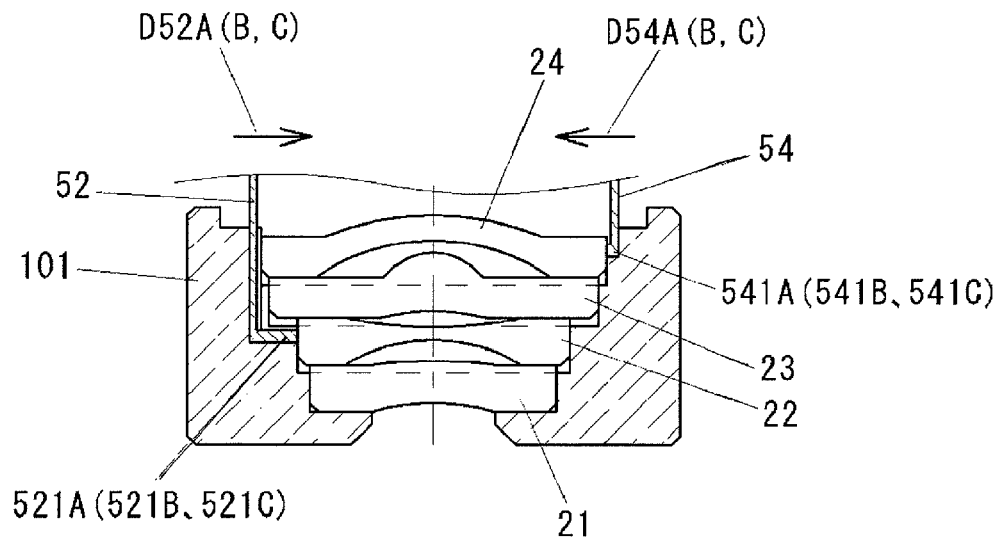
FIG. 18B is a cross-sectional view illustrating how to adjust the positions of the second and fourth lenses using the second and fourth tridirectional adjustment jigs according to the second preferred embodiment, respectively.

Next, the four tridirectional adjustment jigs are inserted into the respective main grooves. As shown in FIG. 16, all of these four tridirectional adjustment jigs can be introduced at the same time into the lens unit 202 in which every lens has already been fit into place. FIG. 17 is a plan view of the lens unit 202, into which the four tridirectional adjustment jigs have been introduced, as viewed in the direction indicated by the arrow PZ1 shown in FIG. 16. FIG. 18A is a cross-sectional view as viewed on the plane that intersects with the claw portions (1A) 511A and (3A) 531A, (1B) 511B and (3B) 531B or (1C) 511C and (3C) 531C and on which the optical axis of these lenses is defined. On the other hand, FIG. 18B is a cross-sectional view as viewed on the plane that intersects with the claw portions (2A) 521A and (4A) 541A, (2B) 512B and (4B) 541B or (2C) 521C and (4C) 541C and on which the optical axis of these lenses is defined.

In such a state, measuring light is passed through the first, second, third and fourth transmitting holes 51A, 52A, 53A and 54A of the first, second, third and fourth tridirectional adjustment jigs 51, 52, 53 and 54, respectively, so that the light is transmitted through all of the fourth through first lenses 24 through 21, thereby checking the degrees of eccentricity of the respective lenses using a transmission eccentricity measuring device. And to reduce the overall degree of eccentricity of all of those lenses inserted, their degrees of eccentricity are adjusted by moving the controlling portions (1A) 512A, (1B) 512B and (1C) 512C of the first tridirectional adjustment jig 51 in the respective directions indicated by the arrows D51A, D51B and D51C shown in FIG. 17, the controlling portions (2A) 522A, (2B) 522B and (2C) 522C of the second tridirectional adjustment jig 52 in the respective directions indicated by the arrows D52A, D52B and D52C, the controlling portions (3A) 532A, (3B) 532B and (3C) 532C of the third tridirectional adjustment jig 53 in the respective directions indicated by the arrows D53A, D53B and D53C and the controlling portions (4A) 542A, (4B) 542B and (4C) 542C of the fourth tridirectional adjustment jig 54 in the respective directions indicated by the arrows D54A, D54B and D54C.

Optionally, when the degrees of eccentricity are adjusted, the light may be incident on the first lens 21 first, instead of passing it through the fourth lens 24 first. In any case, it is preferred that when the degrees of eccentricity are adjusted, the lens unit 202 be fixed in one way or another so as not to move.

In the lens unit 202 of this preferred embodiment, the degree of eccentricity of each lens with respect to the barrel 101 and the relative degrees of eccentricity of the respective lenses can all be adjusted at a time after every lens has been fit into place.

Thereafter, the four tridirectional adjustment jigs are removed from the respective main grooves and then the lenses are bonded to the barrel 101. In the following example, the lenses are supposed to be bonded using a UV curable adhesive.

Figure 19:
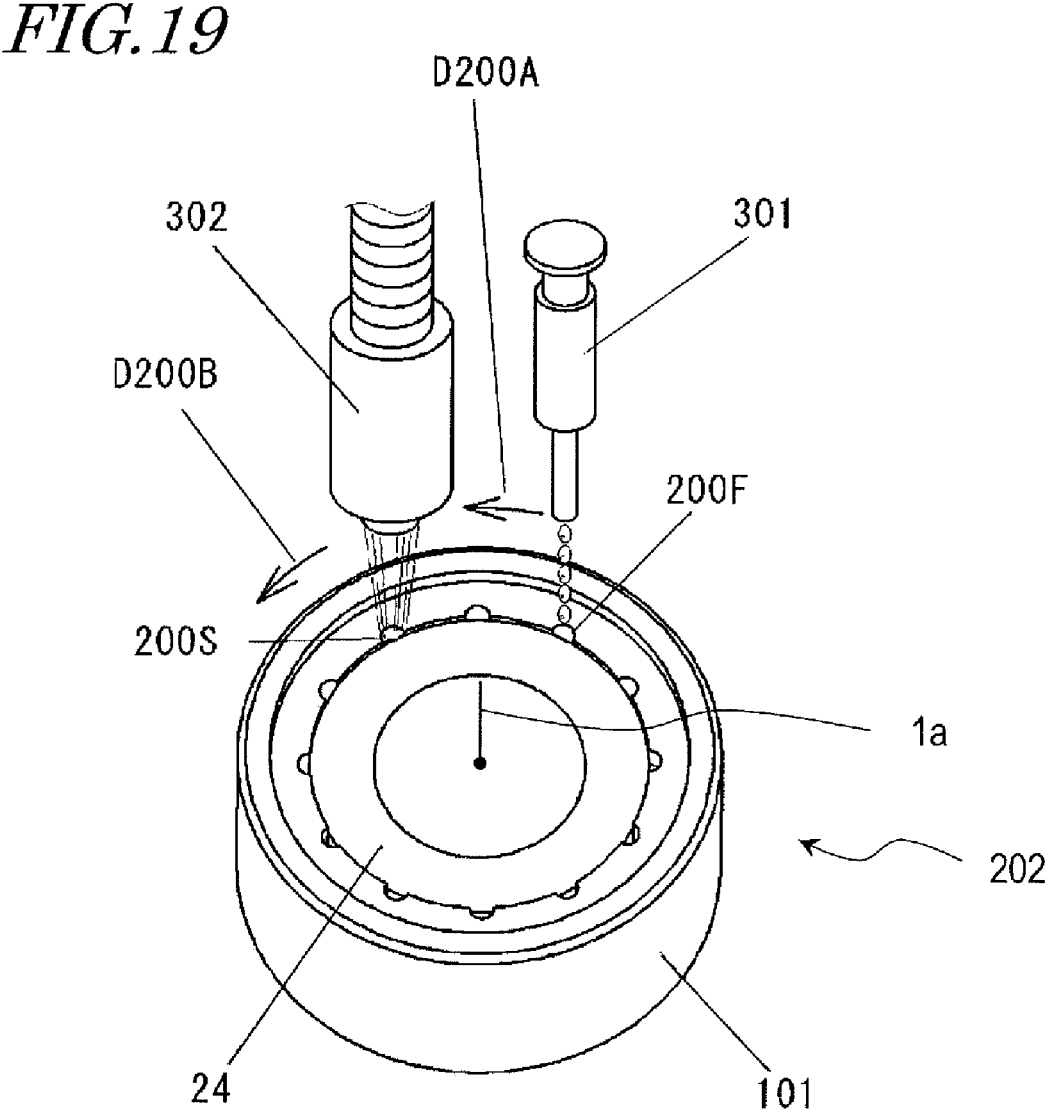
FIG. 19 is a perspective view illustrating the process step of bonding the first, second, third and fourth lenses to the barrel according to the second preferred embodiment.

As shown in FIG. 19, the lens unit 202 is held so that the center axis 1a of the barrel 101 is parallel to the perpendicular direction. The adhesive is dripped with an adhesive injector 301 and is cured by a UV ray radiator 302. According to this preferred embodiment, even in the lens unit 202 in which the degrees of eccentricity of all lenses have been adjusted, all of their main grooves are still open.

First of all, a UV curable adhesive is injected from the adhesive injector 301 into an open main groove at a first position 200F and then the injection is suspended for a while until the adhesive permeates to reach the lens associated with that main groove. In the meantime, the lens unit 202 is rotated in the direction indicated by the arrow D200A, thereby turning the main groove into which the adhesive has been dripped to a second position 200S, where the adhesive is irradiated with an ultraviolet ray that has been radiated from the UV ray radiator 302. Then, the ultraviolet ray passes through the hole of the open main groove and reaches its bottom where the adhesive is collected, thereby curing the adhesive. The duration and intensity of the ultraviolet ray radiated can be appropriately determined by the type of the adhesive used. After that, the lens unit 202 is further rotated so that the adhesive is dripped into the holes of one main groove after another at the first position 200F and that the adhesive is irradiated with an ultraviolet ray and cured at the second position 200S. When every main groove is subjected to these processing steps, the adhesion process can get done.

As can be seen, according to this preferred embodiment, the holes of the main grooves that have been cut through the fifth flange surface 15S are located along the circumference of the same circle, of which the center is defined by the center axis 1a. That is why by rotating the lens unit 202 around the center axis 1a, every lens can be fixed onto the barrel 101 using only one adhesive injector 301 and one UV ray radiator 302.

In addition, since the relative angles defined by all of those main grooves are equal to each other, adhesive force will be applied evenly to each and every lens and the degrees of eccentricity of the lenses with respect to the barrel can be minimized. What is more, the strain caused by the stress will be applied evenly, and therefore, deterioration in optical property due to deformation of the lenses or the lens unit can be reduced significantly. On top of that, the lens unit may be rotated to the same degree when the adhesive is dripped or irradiated with an ultraviolet ray. As a result, the rotation control can be simplified effectively.

Also, according to the arrangement described above, if the radial locations of the respective main grooves with respect to the optical axis of the lenses change stepwise, their arrangement angles will also change stepwise. That is why when the adhesive is injected into the main grooves to bond the respective lenses, it is possible to prevent the adhesive from being distributed unevenly within the barrel. Consequently, the center of mass will hardly deviate due to the distribution of the adhesive.

In this case, if all of the gaps left between the respective main grooves and the outer periphery of the respective lenses, where the adhesive is collected, have substantially the same volume, the adhesive injector 301 may inject substantially the same amount of adhesive into every main groove. As a result, the amount of the adhesive injected can be controlled in a simplified manner.

It should be noted that the adhesive injector 301 does not have to be the type shown in FIG. 19 but could also be an automatic dispenser, for example.

Also, even if the adhesive is a thermosetting adhesive or any other kind of adhesive, the adhesive will just cure differently but can also fix the lenses in a similar manner. In that case, however, the UV ray radiator 302 is not necessary. If a thermosetting adhesive is used, for example, a heat wave radiator or any other appropriate device is preferably used.

Embodiment 3

Hereinafter, a third preferred embodiment of a lens unit according to the present invention will be described.

In the lens unit of this third preferred embodiment, adjacent main grooves communicate with each other, which is a major difference from the second preferred embodiment described above.

Figure 20:
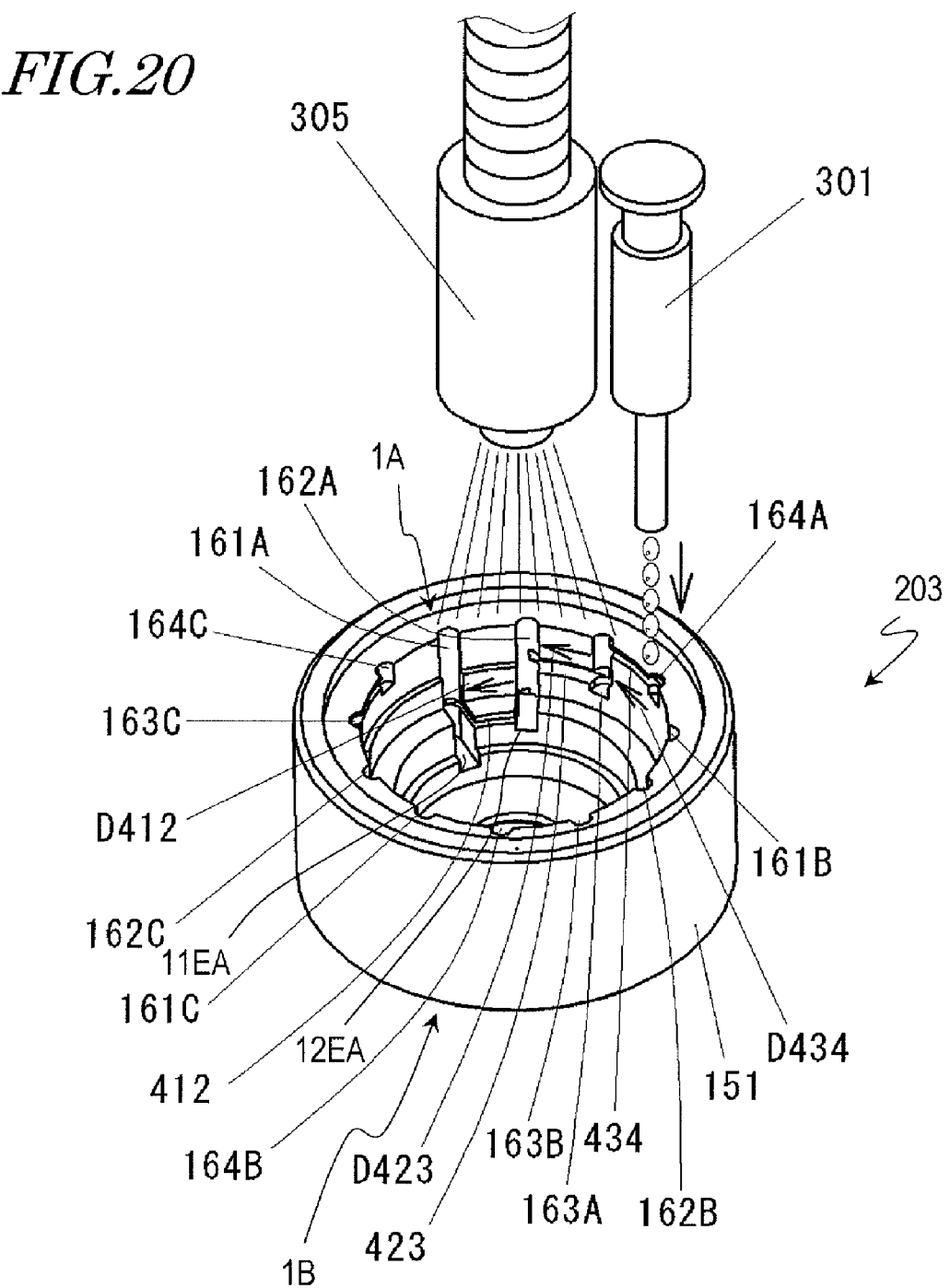
FIG. 20 is a perspective view illustrating the structure of the barrel and the process step of bonding lenses in a lens unit as a third preferred embodiment of the present invention.

FIG. 20 is a perspective view illustrating the barrel 151 of a lens unit 203 as a third specific preferred embodiment of the present invention. As shown in FIG. 20, first, second and third communicating grooves 412, 423 and 434 have been cut on the barrel 151 between the main grooves (1A) 161A and (2A) 162A, between the main grooves (2A) 162A and (3A) 163A, and between the main grooves (3A) 163A and (4A) 164A, respectively, to connect each of these pairs of grooves with each other. Each of these communicating grooves, which connects two main grooves together, is arranged closer to the second opening 1A than one end of those two main grooves that is located closer to the first opening 1B is. For example, the first communicating groove 412 that connects together the main grooves (1A) 161A and (2A) 162A is arranged closer to the second opening 1A than the ends 11EA and 12EA are.

Although not shown in FIG. 20, similar communicating grooves have also been cut between the main grooves (1B) 161B and (2B) 162B, between the main grooves (2B) 162B and (3B) 163B, between the main grooves (3B) 163B and (4B) 164B, between the main grooves (1C) 161C and (2C) 162C, between the main grooves (2C) 162C and (3C) 163C, and between the main grooves (3C) 163C and (4C) 164C.

After the first, second, third and fourth lenses 21, 22, 23 and 24 have been fit into such a barrel 151, the main grooves (1A) 161A, (1B) 161B, (1C) 161C, (2A) 162A, (2B) 162B, (2C) 162C, (3A) 163A, (3B) 163B, (3C) 163C, (4A) 164A, (4B) 164B, and (4C) 164C are filled with an adhesive, thereby bonding the respective lenses to the barrel 151 as in the second preferred embodiment described above.

In this case, the communicating grooves are arranged between the respective main grooves according to this preferred embodiment. That is why just by injecting the adhesive with the adhesive injector 301 set to the position of the main groove (4A) 164A, the adhesive will sequentially flow into its adjacent main grooves (3A) 163A, (2A) 162A and (1A) 161A as shown in FIG. 20. In this case, supposing a UV curable adhesive is used as the adhesive, if the adhesive is irradiated with an UV ray by a UV ray radiator 305 after having reached the main groove (1A) 161A, the adhesive will cure. If all of the main grooves (1A) 161A through (4A) 164A are irradiated by the UV ray radiator 305, the adhesive can be cured simultaneously everywhere. The duration and the intensity of the UV ray radiated can be determined appropriately by the kind of the adhesive used.

After that, the adhesive will be sequentially injected and cured with the adhesive injector 301 set to the position of the main groove (4B) 164B or (4C) 164C. In this manner, every lens can get bonded to the barrel 151 eventually.

It should be noted that the first, second and third communicating grooves 412, 423, and 434 that have been cut on the barrel 151 do not always have to be arranged as shown in FIG. 20.

The adhesive injector 301 does not have to be the one shown in FIG. 20, but may also be an automatic dispenser, for example.

Also, even if the adhesive is a thermosetting adhesive or any other kind of adhesive, the adhesive will just cure differently but can also fix the lenses in a similar manner. In that case, however, the UV ray radiator 302 is not necessary. If a thermosetting adhesive is used, for example, a heat wave radiator or any other appropriate device is preferably used.

As described above, according to this preferred embodiment, in the barrel 151, a communicating groove is arranged between adjacent main grooves closer to the second opening 1A than one end of those main grooves that is closer to the first opening 1B is. That is why a level difference is made between the first communicating groove 412 and the main groove (2A) 162A (or the main groove (2B) 162B or (2C) 162C), between the second communicating groove 423 and the main groove (3A) 163A (or the main groove (3B) 163B or (3C) 163C), and between the third communicating groove 434 and the main groove (4A) 164A (or the main groove (4B) 164B or (4C) 164C). Since these level differences provide spaces to collect the adhesive from the ends of the respective main grooves, stronger adhesive force can be produced.

Also, if all of those spaces to collect the adhesive have the same volume, the adhesive force can be applied evenly to the entire periphery of the lenses. That is why even if the cylindrical portion of barrel 151 were slightly pulled toward the lenses being bonded, the barrel 151 would still be deformed evenly over its entire periphery. Consequently, deterioration in the optical properties of the lens unit assembled would be minimum even in that case.

Embodiment 4

Hereinafter, a fourth preferred embodiment of a lens unit according to the present invention will be described.

The first preferred embodiment of the present invention described above adopts a structure in which the first and second lenses 21 and 22, the second and third lenses 22 and 23, and the third and fourth lenses 23 and 24 contact with each other, thereby positioning themselves along the center axis of the barrel (i.e., along the optical axis of the lenses). On the other hand, this preferred embodiment adopts a structure in which the barrel itself positions those lenses along its own center axis.

Figure 21:
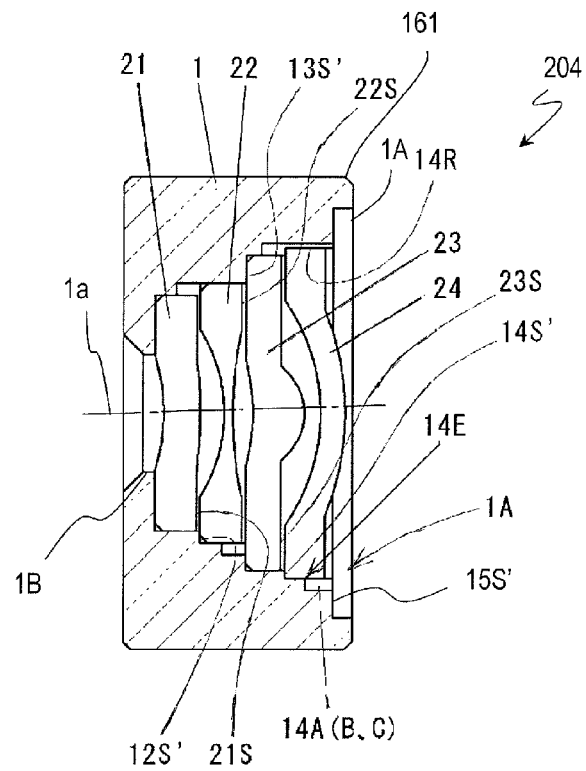
FIG. 21 is a cross-sectional view illustrating a fourth preferred embodiment of a lens unit according to the present invention.

FIG. 21 illustrates a cross section of a lens unit 204 as a fourth preferred embodiment of the present invention. As shown in FIG. 21, the barrel 161 of the lens unit 204 has a second flange surface 12S' defined between the first and second inner side surface portions 11R and 12R, a third flange surface 13S' defined between the second and third inner side surface portions 12R and 13R, and a fourth flange surface 14S' defined between the third and fourth inner side surface portions 13R and 14R.

The second flange surface 12S' contacts with a contacting surface 22T, which forms part of the principal surface of the second lens 22, thereby positioning the second lens 22 along the center axis 1a. In the same way, the third flange surface 13S' contacts with a third contacting surface 23T, which forms part of the principal surface of the third lens 23, thereby positioning the third lens 23 along the center axis 1a. And the fourth flange surface 14S' contacts with a fourth contacting surface 24T, which forms part of the principal surface of the fourth lens 24, thereby positioning the fourth lens 24 along the center axis 1a.

In the first preferred embodiment described above, the contacting surface 21S of the first lens 21 is located closer to the second opening 1A than the second flange surface 12S is. On the other hand, according to this preferred embodiment, when the first lens 21 is held in the barrel 161, the second flange surface 12S' is located closer to the second opening 1A than the contacting surface 21S of the first lens 21 is. That is why the contacting surface 22T of the second lens 22, which is located closer to the second opening 1A, contacts with the second flange surface 12S'. In the same way, the third flange surface 13S' is located closer to the second opening 1A than the contacting surface 22S of the second lens 22 is, and the fourth flange surface 14S' is located closer to the second opening 1A than the contacting surface 23S of the third lens 23 is. Consequently, none of the first and second lenses 21 and 22, the second and third lenses 22 and 23, and third and fourth lenses 23 and 24 contact with each other but there is a gap between each of these three pairs of lenses.

In this preferred embodiment, all of the flange surfaces of the barrel 161 and all of the contacting surfaces of the lenses are supposed to be planar. However, either the flange surfaces or the contacting surfaces may be planar and the other type may have projections, which will make the lenses supportable at three or more points. Even so, the respective lenses can also be positioned along the center axis 1a.

Embodiment 5

Hereinafter, a preferred embodiment of a camera device according to the present invention will be described.

Figure 22A:
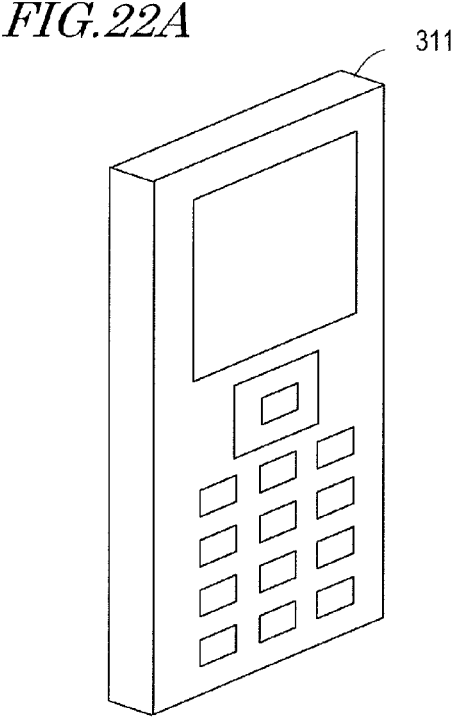
FIG. 22A is a perspective view illustrating a cellphone with a camera device as a preferred embodiment of the present invention.
Figure 22B:
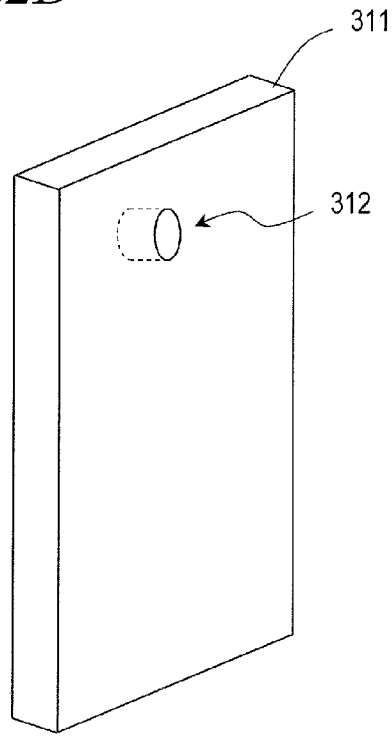
FIG. 22B is another perspective view illustrating a cellphone with a camera device as a preferred embodiment of the present invention.
Figure 22C:
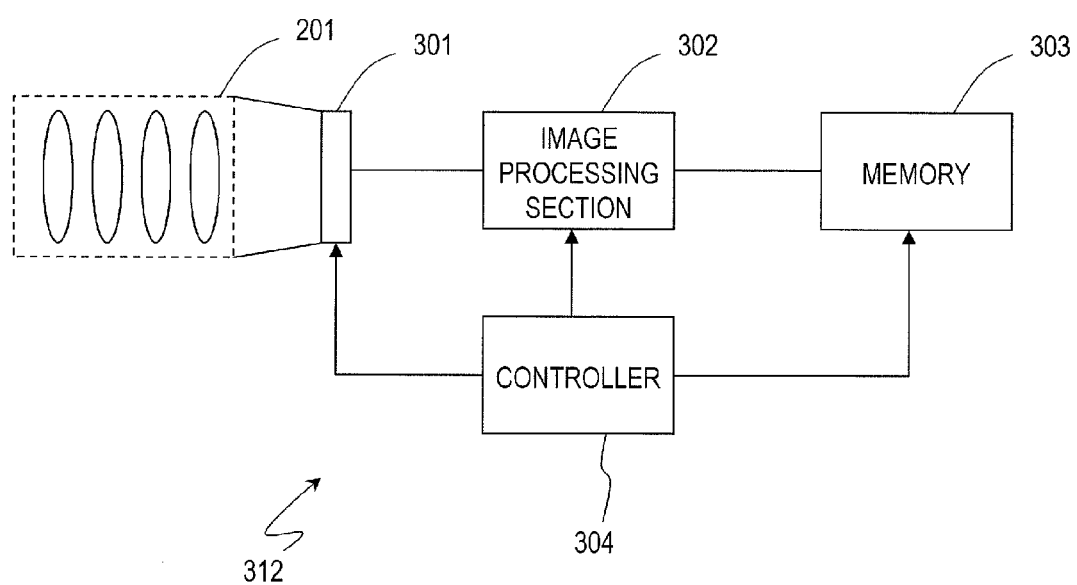
FIG. 22C is a block diagram illustrating a configuration for the camera device according to the preferred embodiment of the present invention.
Figure 23:
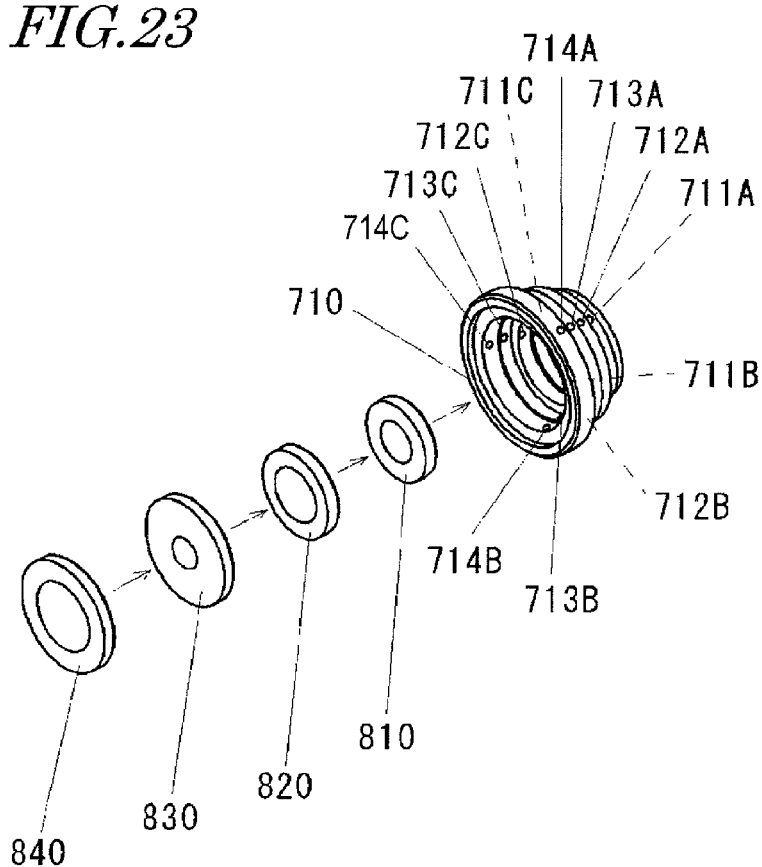
FIG. 23 is an exploded perspective view illustrating the conventional procedure of assembling a lens block.
Figure 24:
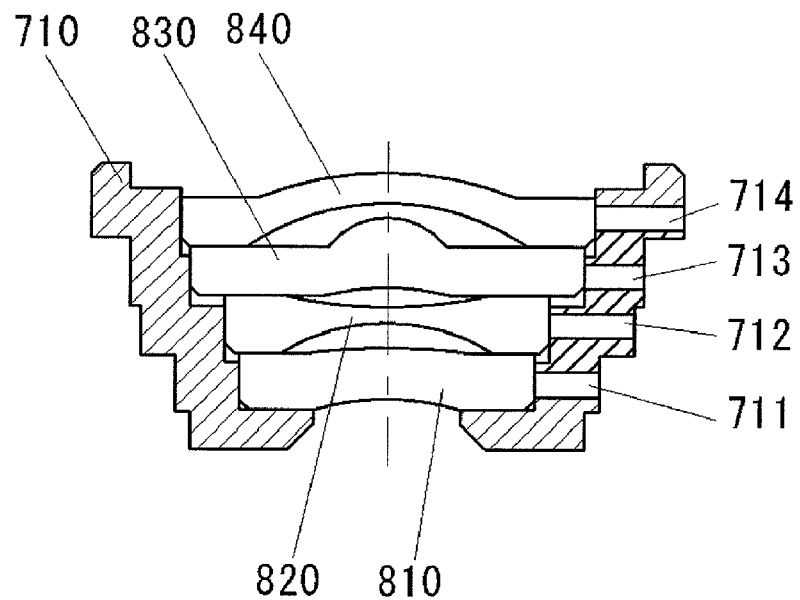
FIG. 24 is a cross-sectional view illustrating how lenses have been inserted into a fixing jig in the conventional procedure of assembling a lens block.

FIGS. 22A and 22B are perspective views illustrating the principal surface and back surface of a cellphone 311 including a camera device 312 as a fifth preferred embodiment of the present invention. FIG. 22C is a block diagram schematically illustrating the configuration of the camera device 312, which includes a lens unit 201, an image capturing section 301, an image processing section 302, a memory 303 and a controller 304.

In this preferred embodiment, the camera device 312 includes the lens unit 201 of the first preferred embodiment described above. Instead, the camera device 312 may also include the lens unit of the second, third or fourth preferred embodiment of the present invention described above.

The image capturing section has an image sensing area 301a and converts an image, which has been produced by the lens unit 201 in the image sensing area 301a, into an electrical signal. The image processing section 302 receives the electrical signal from the image capturing section 301 and generates image data representing the image captured. The image data thus generated is stored in the memory 303. The image to be captured by the camera device 312 does not have to be a still picture but may also be moving picture as well.

In accordance with the user's instruction that has been entered with control buttons 313 of the cellphone 311, the controller 304 controls the image capturing section 301, the image processing section 302 and the memory 303, thereby performing a predetermined kind of image processing, shooting a photo, or storing image data in the memory 303.

The camera device of this preferred embodiment uses the lens unit 201 as an optical system that forms an integral part of it, and has a very good optical property. That is why this camera device 312 can be built in the cellphone 311 by performing a relatively simple assembling process, and excellent optical performance can be achieved. On top of that, since the stress caused by bonding has been dispersed as described above, it is possible to prevent the optical property of the lens unit 201 assembled from deteriorating. Thus, the present invention provides a cellphone, of which the optical property hardly varies, and which can achieve excellent camera performance, even in various operating environments.

In the first through fifth preferred embodiments of the present invention described above, the same effect can be achieved no matter whether the lenses are made of a resin or glass. Nevertheless, a metallic barrel is preferably combined with glass lenses but a resin barrel is preferably combined with resin lenses because not only their difference in linear expansivity but also the strain that would be produced due to their difference in the degree of thermal deformation can be reduced in that case. Also, in either case, the optically effective parts of the respective lenses do not have to have the shapes shown in the drawings.

As can be seen from the foregoing description, the lens unit according to any of the first through fifth preferred embodiments of the present invention described above can precisely align with each other the respective lenses to be inserted into the barrel and can bond those lenses to the barrel under uniform conditions at each bonding portion. In addition, by using jigs after those lenses have been inserted, the degrees of eccentricity of the lenses can be adjusted perpendicularly to the optical axis of the lenses, among other things.

On top of that, since the main grooves are used to collect the adhesive, the adhesive can be arranged at desired positions. As a result, the lenses can be securely bonded to the barrel with the adhesive.

Furthermore, since the adhesive can be injected into every main grooves parallel to the optical axis of the lenses, the adhesive always drips in one direction. As a result, the stability of adhesion can be increased and it is possible to avoid an unwanted situation where the lenses are positioned with respect to the barrel with low precision. Furthermore, as the bonding process is carried out in one direction, the working space would not expand too much.

What is more, such an arrangement can be provided even without providing means for positioning the lenses in the optical axis direction.

On top of that, even though the main grooves are cut on the inner surface of the barrel, that inner surface is never exposed to the external environment. That is why even without taking any special measure such as provision of some additional member, it is possible to prevent unwanted external light from entering the regular optical path of the lens unit working and to eliminate harmful influence on the image captured.

In addition, since the main grooves are not arranged at the same azimuth around the lenses, the bonding process and the adjustment of eccentricity can get done more efficiently on multiple points at the same time.

Furthermore, since the main grooves are arranged at regular angular intervals around the lenses, the adhesive will not apply uneven adhesive force perpendicularly to the optical axis of the lenses, and therefore, the degrees of eccentricity of the lenses with respect to the barrel can be minimized. On top of that, the stress applied to the lenses and the barrel has been produced evenly around the entire circumference of the lenses, and therefore, no strain will be produced unevenly on the lenses or the barrel.

Also, as the radial locations of the respective main grooves with respect to the optical axis of the lenses change stepwise, their arrangement angles also change stepwise. That is why when the respective lenses are bonded with the adhesive injected into the main grooves, it is possible to prevent the adhesive from being distributed unevenly inside the barrel, and therefore, a proper balance can be struck as far as the center of mass is concerned. As a result, even when the lens unit needs to be operated for the purpose of image stabilization, for example, their centers of mass can be balanced appropriately.

In addition, the main grooves associated with the respective lenses are closed in the spaces formed by themselves with respect to the outer periphery of the lenses except their holes at the inserting opening of the barrel. For that reason, even when the adhesive is injected into the main grooves, the adhesive will never leak through any of the gaps between the lens to be bonded and the main grooves to reach a deeper lens by any chance. Consequently, it is possible to avoid a situation where lenses other than the one to be bonded are subject to unwanted influence.

On top of that, as the same amount of adhesive is injected into each and every main groove, the adhesive injector may inject the same amount of adhesive into each of the main grooves when the lenses need to be bonded with the adhesive.

Plus, when the adhesive is going to be injected into the main grooves, the adhesive injector may be fixed at a particular radial location.

What is more, even after all of those lenses have been fit into the barrel, eccentricity adjustment jigs can also be inserted deep enough to reach those lenses. That is to say, even after the barrel has already been assembled, the degrees of eccentricity of the respective lenses can still be adjusted at a time.

In addition, just by injecting the adhesive into only the main grooves that are located closest to the inserting opening of the barrel, the adhesive will flow to reach the other deeper main grooves. As a result, the number of bonding process steps to perform or the number of adhesive injectors to use can be cut down.

Added to that, as there is a level difference between each communicating groove and the bottom of its associated main grooves, the adhesive can be collected at the intended parts of the main grooves, thus avoiding an unwanted situation where the lenses are not bonded securely.

Moreover, a level difference can be produced just as intended between each communicating groove and the bottom of its associated main grooves and the same amount of adhesive can be collected in every main groove. As a result, the bond strength can be uniform at every bonding spot. Consequently, since force will be applied evenly to the lenses and the barrel, it is possible to avoid a situation where strain is produced unevenly in those members.

INDUSTRIAL APPLICABILITY

The lens unit of the present invention is applicable to a piece of visual equipment with any of various optical systems and can be used effectively in digital still cameras and digital camcorders in various applications.

REFERENCE SIGNS LIST 1, 101, 151 barrel
1A second opening
1B first opening
11R first inner side surface portion
12R second inner side surface portion
13R third inner side surface portion
14R fourth inner side surface portion
11A main groove (1A)
11B main groove (1B)
11C main groove (1C)
12A main groove (2A)
12B main groove (2B)
12C main groove (2C)
13A main groove (3A)
13B main groove (3B)
13C main groove (3C)
14A main groove (4A)
14B main groove (4B)
14C main groove (4C)
11EA, 11EB, 11EC end
12EA, 12EB, 12EC end
13EA, 13EB, 13EC end
14EA, 14EB, 14EC end
11S, 11S' first flange surface
12S, 12S' second flange surface
13S, 13S' third flange surface
14S, 14S' fourth flange surface
21 first lens
22 second lens
23 third lens
24 fourth lens
21S, 22S, 23S, 24S contacting surface
21T, 22T, 23T, 24T contacting surface
201, 202, 203, 204 lens unit
111A main groove (1A)

111B main groove (1B)
111C main groove (1C)
112A main groove (2A)
112B main groove (2B)
112C main groove (2C)
113A main groove (3A)
113B main groove (3B)
113C main groove (3C)
114A main groove (4A)
114B main groove (4B)
114C main groove (4C)
J1 first adjustment jig
J2 second adjustment jig
J3 third adjustment jig
J4 fourth adjustment jig
51 first tridirectional adjustment jig
52 second tridirectional adjustment jig
53 third tridirectional adjustment jig
54 fourth tridirectional adjustment jig
51A first transmitting hole
52A second transmitting hole
53A third transmitting hole
54A fourth transmitting hole
511A claw portion (1A)
511B claw portion (1B)
511C claw portion (1C)
512A controlling portion (1A)
512B controlling portion (1B)
512C controlling portion (1C)
521A claw portion (2A)
521B claw portion (2B)
521C claw portion (2C)
522A controlling portion (2A)
522B controlling portion (2B)
522C controlling portion (2C)
531A claw portion (3A)
531B claw portion (3B)
531C claw portion (3C)
532A controlling portion (3A)
532B controlling portion (3B)
532C controlling portion (3C)
541A claw portion (4A)
541B claw portion (4B)
541C claw portion (4C)
542A controlling portion (4A)
542B controlling portion (4B)
542C controlling portion (4C)
301 adhesive injector
302 ultraviolet ray radiator
200F first position
200S second position
412 first communicating groove
423 second communicating groove
434 third communicating groove

The invention claimed is:

1. A lens unit comprising:
a barrel, which has first and second openings and an inner space that is defined along a center axis between the first and second openings; and
a number of lenses held in the inner space,
wherein in each pair of adjacent ones of the lenses, one of the two lenses located closer to the second opening has a greater projection shape which is projected in an optical axis thereof than the other lens located closer to the first opening, and
wherein the barrel has a number of inner side surface portions, which are arranged parallel to the center axis to define cross sections corresponding to the respective projections of the lenses, and
wherein in each pair of adjacent ones of the inner side surface portions, one of the two portions located closer to the second opening has a greater cross section than the other portion located closer to the first opening, and
wherein the barrel has a number of main grooves that have been cut on the inner side surface portions to run from the first opening toward the second opening, and
wherein each of the lenses is bonded to an associated one of the inner side surface portions with an adhesive that fills at least partially the main grooves on the inner side surface portion, and
wherein azimuths of the main grooves of each said inner side surface portion with respect to the center axis are different from those of the main grooves of any other one of the inner side surface portions.

2. The lens unit of claim 1, wherein the barrel has a positioning plane, which contacts with one of the lenses that is arranged closest to the first opening and which positions the lens in an optical axis direction, and
wherein each of the lenses contacts with its adjacent lens(es) in the optical axis direction, thereby positioning the lenses parallel to the center axis.

3. The lens unit of claim 1, wherein the barrel has a number of contacting portions, each of which contacts with an associated one of the lenses, thereby positioning the lens parallel to the center axis of that lens.

4. The lens unit of claim 2, wherein the barrel has an outer side surface, and
wherein none of the main grooves that have been cut on each said inner side surface portion reach the outer side surface.

5. The lens unit of claim 2, wherein in each said inner side surface portion, the main grooves are arranged at regular angular intervals around the center axis.

6. The lens unit of claim 1, wherein each and every one of the inner side surface portions has the same number of main grooves, and wherein azimuths of the main grooves of each said inner side surface portion with respect to the center axis shift sequentially in one direction from the first opening toward the second opening.

7. The lens unit of claim 1, wherein in each said inner side surface portion, one end of each said main groove, which is closer to the first opening, is located between the two contacting surfaces of its associated lens along the center axis of the barrel.

8. The lens unit of claim 1, wherein the spaces to be produced adjacent to the side surface of each said lens by the main grooves of its associated inner side surface portion have substantially the same volumes everywhere.

9. The lens unit of claim 1, wherein in each said inner side surface portion, the respective bottoms of the main grooves are located at the same distance from the center axis of the barrel.

10. The lens unit of claim 1, wherein the inner side surface portions have at least one communicating groove that makes two adjacent ones of the main grooves continuous with each other.

11. The lens unit of claim 10, wherein each said communicating groove, which connects two main grooves together, is arranged closer to the second opening than one end of the two main grooves that is located closer to the first opening is.

12. The lens unit of claim 11, wherein the space to be produced adjacent to the side surface of each said lens by at least one main groove on each said inner side surface portion and located closer to the first opening than the communicating groove is has substantially the same volume from one inner side surface portion to another.

13. A camera device comprising:
the lens unit of claim 1;
an image capturing section, which has an image capturing area and which converts an image that has been captured by the lens unit into an electrical signal; and
an image processing section, which receives the electrical signal from the image capturing section to generate image data representing the image.

* * * * *